United States Patent
Barakat et al.

(10) Patent No.: US 11,332,389 B1
(45) Date of Patent: May 17, 2022

(54) RECYLABLE MULTIFUNCTIONAL COMPOSITES FOR METAL ION REMOVAL FROM WATER

(71) Applicant: King Abdulaziz University, Jeddah (SA)

(72) Inventors: Mohamed Barakat, Jeddah (SA); Rajeev Kumar, Jeddah (SA); Md A. Abu Taleb, Jeddah (SA); Moaaz Seliem, Jeddah (SA)

(73) Assignee: KING ABDULAZIZ UNIVERSITY, Jeddah (SA)

(*) Notice: Subject to any disclaimer, the term of this patent is extended or adjusted under 35 U.S.C. 154(b) by 0 days.

(21) Appl. No.: 17/200,974

(22) Filed: Mar. 15, 2021

(51) Int. Cl.
| | | |
|---|---|---|
| C02F 1/28 | (2006.01) | |
| B01J 20/10 | (2006.01) | |
| B01J 20/26 | (2006.01) | |
| B01J 20/28 | (2006.01) | |
| B01J 20/32 | (2006.01) | |
| B01J 20/34 | (2006.01) | |
| B01D 15/20 | (2006.01) | |
| C02F 101/22 | (2006.01) | |

(52) U.S. Cl.
CPC ............ *C02F 1/288* (2013.01); *B01D 15/203* (2013.01); *B01D 15/206* (2013.01); *B01J 20/103* (2013.01); *B01J 20/262* (2013.01); *B01J 20/28016* (2013.01); *B01J 20/28026* (2013.01); *B01J 20/28033* (2013.01); *B01J 20/3295* (2013.01); *B01J 20/3425* (2013.01); *B01J 2220/46* (2013.01); *C02F 1/281* (2013.01); *C02F 1/283* (2013.01); *C02F 1/285* (2013.01); *C02F 2101/22* (2013.01); *C02F 2303/16* (2013.01)

(58) Field of Classification Search
CPC . B01J 20/10; B01J 20/103; B01J 20/20; B01J 20/262; B01J 20/28014; B01J 20/28016; B01J 20/3204; B01J 20/324; B01J 20/3297; B01J 20/3289; B01J 20/3272
See application file for complete search history.

(56) References Cited

U.S. PATENT DOCUMENTS

| | | | | |
|---|---|---|---|---|
| 9,339,790 B2* | 5/2016 | Vittadello | ............... | B82Y 30/00 |
| 10,258,932 B2* | 4/2019 | Birss | ................... | H01M 8/0243 |

(Continued)

FOREIGN PATENT DOCUMENTS

| | | | | |
|---|---|---|---|---|
| WO | 2015148635 | | 10/2015 | |
| WO | WO-2016057715 A1 * | 4/2016 | ............. | B01D 15/08 |

OTHER PUBLICATIONS

Zhang et al. Removal of heavy metals in aquatic environment by graphene oxide composites: a review. Environmental Science and Pollution Research (2020) 27:190-209. (Year: 2020).*

(Continued)

*Primary Examiner* — Bradley R Spies
*Assistant Examiner* — Jeannie McDermott
(74) *Attorney, Agent, or Firm* — WC&F IP

(57) ABSTRACT

A composite for adsorption of metal ions including silica microparticles, graphene oxide sheets, and polyaniline is provided. The graphene oxide sheets and polyaniline are distributed on a surface of the silica microparticles. Methods for removing cationic and anionic metal ions from a solution such as wastewater are also provided.

12 Claims, 11 Drawing Sheets
(11 of 11 Drawing Sheet(s) Filed in Color)

(56) References Cited

U.S. PATENT DOCUMENTS

| | | | | |
|---|---|---|---|---|
| 2011/0269920 | A1* | 11/2011 | Min | B82Y 30/00 |
| | | | | 525/540 |
| 2012/0330044 | A1* | 12/2012 | Hou | B82Y 40/00 |
| | | | | 556/9 |
| 2013/0240439 | A1 | 9/2013 | Pradeep et al. | |
| 2015/0340171 | A1* | 11/2015 | Li | C01B 32/192 |
| | | | | 252/508 |
| 2017/0096657 | A1* | 4/2017 | Gosselin | C02F 3/108 |

OTHER PUBLICATIONS

Yang et al. Graphene-coated materials using silica particles as a framework for highly efficient removal of aromatic pollutants in water. Scientific Reports, 5:11641, Jun. 29, 2015. (Year: 2015).*

Wang et al. Mesoporous polyaniline film on ultra-thin graphene sheets for high performance supercapacitors. Journal of Power Sources 247 (2014) 197-203. (Year: 2014).*

Ma et al. Rational design, synthesis, and application of silica/graphene-based nanocomposite: A review. Materials and Design 198 (2021) 109367. (Year: 2021).*

Liu et al. Graphene-coated silica as a highly efficient sorbent for residual organophosphorus pesticides in water. J. Mater. Chem. A, 2013, 1, 1875. (Year: 2013).*

Liu et al. Magnetic porous silica-graphene oxide hybrid composite as a potential adsorbent for aqueous removal of p-nitrophenol. Colloids and Surfaces A: Physicochem. Eng. Aspects 490 (2016) 207-214. (Year: 2016).*

Li et al. Preparation of polyaniline/reduced graphene oxide nanocomposite and its application in adsorption of aqueous Hg(II). Chemical Engineering Journal 229 (2013) 460-468. (Year: 2013).*

Hong et al. Recent Progress on Graphene/Polyaniline Composites for High-performance Supercapacitors. Materials 2019, 12, 1451. (Year: 2019).*

Han et al. Facile Assembly of Polyaniline/Graphene Oxide Composite Hydrogels as Adsorbent for Cr(VI) Removal. Polymer Composites (2019) E1777-E1785. (Year: 2019).*

Ding et al. Excellent electromagnetic wave absorption property of quaternary composites consisting of reduced graphene oxide, polyaniline andFeNi3@SiO2nanoparticles. Applied Surface Science 357 (2015) 908-914. (Year: 2015).*

Javed et al. Mesoporous silica wrapped with graphene oxide-conducting PANI nanowires as a novel hybrid electrode for supercapacitor. Journal of Physics and Chemistry of Solids 113 (2018) 220-228. (Year: 2018).*

Roosz, N et al., A straightforward procedure for the synthesis of silica@polyaniline core-shell nanoparticles, 2019, Colloids and Surfaces A: Physicochemical and Engineering Aspects, vol. 573, 2019, pp. 237-245, https://doi.org/10.1016/j.colsurfa.2019.04.036. (Year: 2019).*

Roosz, N et al. Synthesis and characterization of polyaniline-silica composites: Raspberry vs core-shell structures. Where do we stand?, Journal of Colloid and Interface Science, 2017, vol. 502, pp. 184-192, https://doi.org/10.1016/j.jcis.2017.04.092. (Year: 2017).*

Gao, Wei, et al. Engineered Graphene Oxide Materials for Application in Water Purification, 2011, Applied Materials and Interfaces, dx.doi.org/10.1021/am200300u | ACS Appl. Mater. Interfaces 2011, 3, 1821-1826 (Year: 2011).*

Yang, Yongfang, et al., Preparation of PANI Grafted at the edge of Graphene Oxide Sheets and its Adsorption of Pb(II) and Methylene Blue, 2016, DOI 10.1002/pc.24114 VC 2016 Society of Plastics Engineers (Year: 2016).*

Karthik, R, et.al., Removal of hexavalent chromium ions using polyaniline/silica gel composite,Journal of Water Process Engineering, vol. 1, 2014, pp. 37-45, https://doi.org/10.1016/j.jwpe.2014.03.001. (Year: 2014).*

Bilgic et al., "Removal of chromium(VI) from polluted wastewater by chemical modification of silica gel with 4-acetyl-3-hydroxyaniline", RSC Adv., 2019, 9, 37403.

Burakov et al., "Adsorption of heavy metals on conventional and nanostructured materials for wastewater treatment purposes: A review", Ecotoxicology and Environmental Safety 148 (2018) 702-712.

Javadian et al., "Experimental investigation on enhancing aqueous cadmium removal via nanostructure composite of modified hexagonal type mesoporous silica with polyaniline/polypyrrole nanoparticles", Journal of Industrial and Engineering Chemistry, vol. 20, Issue 5, Sep. 25, 2014, pp. 3678-3688.

Wang et al., "Synergistic Removal of Pb(II), Cd(II) and Humic Acid by Fe3O4@Mesoporous Silica-Graphene Oxide Composites", (2013) PLoS ONE 8(6): e65634.

Wang et al., "Conductive polyaniline-graphene oxide sorbent for electrochemically assisted solid-phase extraction of lead ions in aqueous food samples", Analytica Chimica Acta, vol. 1100, Mar. 1, 2020, pp. 57-65.

* cited by examiner

FIG. 2A
FIG. 2B
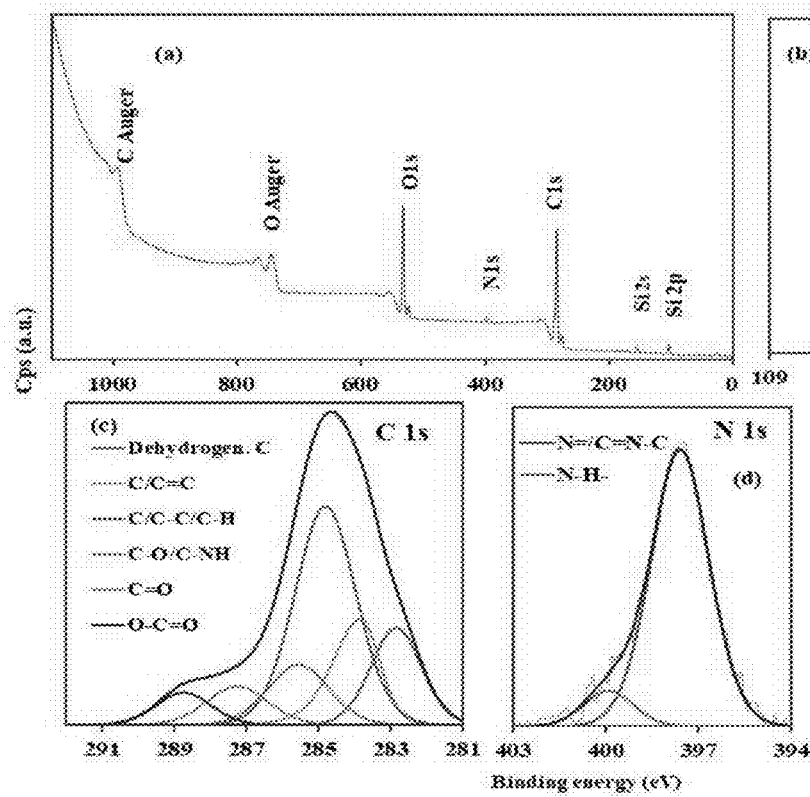
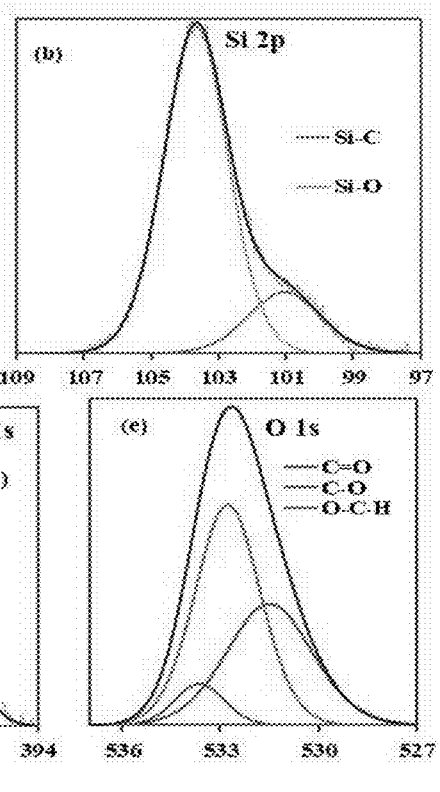
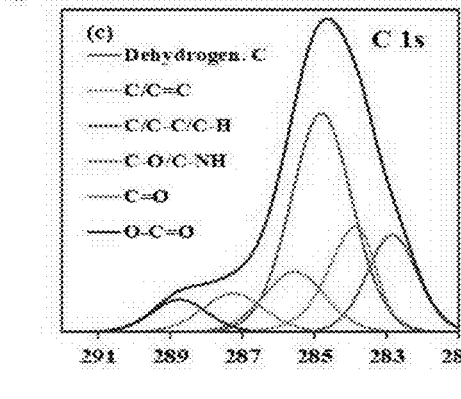
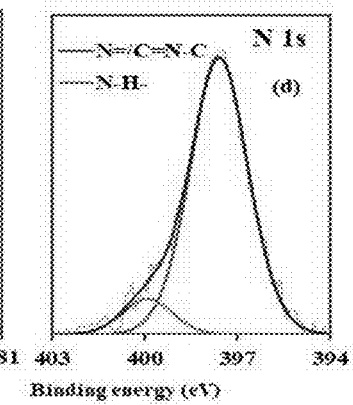
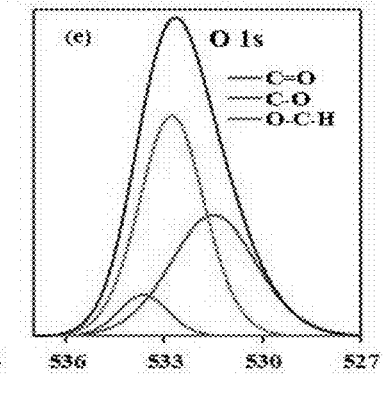
FIG. 2C
FIG. 2D
FIG. 2E

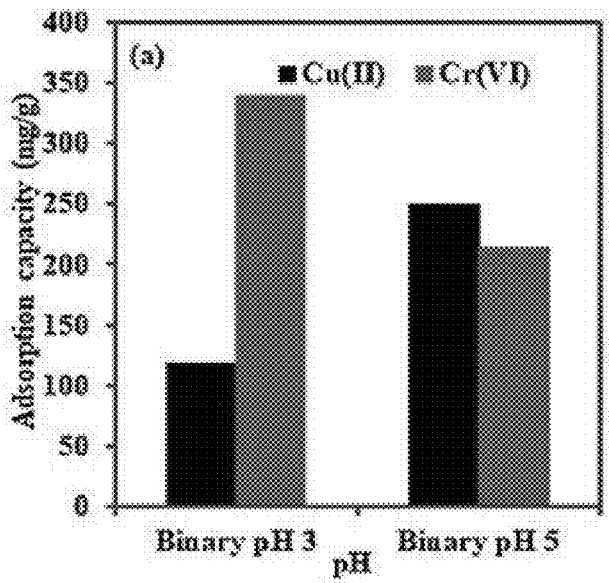 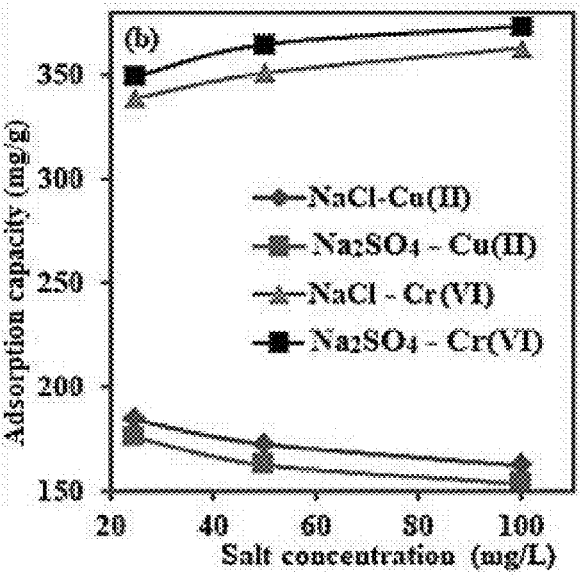
FIG. 9A              FIG. 9B
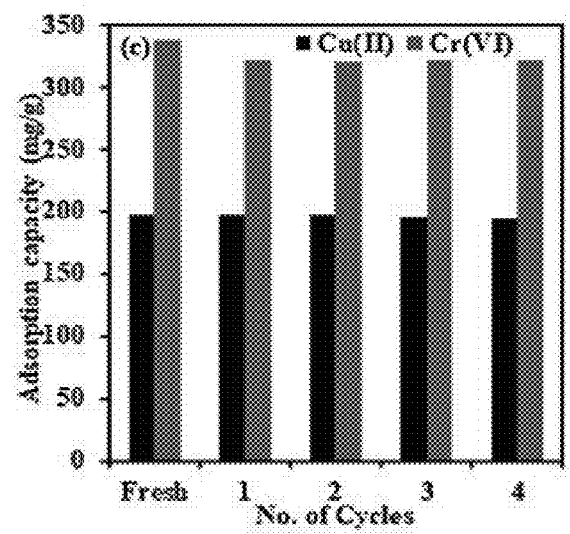
FIG. 9C

RECYLABLE MULTIFUNCTIONAL COMPOSITES FOR METAL ION REMOVAL FROM WATER

FIELD OF THE INVENTION

The invention is generally related to composites useful for decontaminating wastewater by removing metal ions such as Cu(II) and Cr(VI).

BACKGROUND OF THE INVENTION

In developing countries like China, India, and Bangladesh, the contamination of the surface and groundwater is mainly related to natural and human activities. The discharge of heavy metal ions from various anthropogenic as well as natural sources has had a severe impact on human health and the environment. Copper and chromium are widely used in various industrial applications. Metal polishing and finishing, electroplating, refining, smelting, batteries, leather tanning, dyeing and pigments etc. industries are considered as heavy metal contamination sources in groundwater due to release of untreated wastewater (Zhang et al., 2015; Awual, 2015). A low concentration of Cu(II) is essential for maintaining the cell functions of living organisms. However, above the permissible limit, metal ions in water may severely affect the ecological cycle and, subsequently, human health and plant and microbes through circulation and accumulation in the food chain (Demiral and Güngor, 2016; GracePavithra et al., 2019). Therefore, researchers are looking for an advanced technology for heavy metals scavenging from the industrial as well as natural aqueous systems.

Several methods like membrane filtration, sulfur reduction, ion-exchange, electrochemical treatment, and chemical precipitation, etc. have been used for toxic heavy metals scavenging from polluted effluents. (Fu and Wang, 2011; Rasaki et al., 2019). However, these approaches have some limitations such as demanding tools, operational costs, weak metal recovery, and sludge management (Pacheco et al., 2006). The adsorption method has been popular to capture the cationic and anionic metals due to ease of operation, economically convenience, wide application, significant metal recovery, efficiency, and the possibility of reuse of adsorbent. Activated carbon, metal oxides, polymeric resins, and a variety of waste materials, nanomaterials and composites (Burakov et al., 2018) have been investigated for the separation and pre-concentration of toxic metallic contaminants from water.

Generally, experimental adsorption data have been examined using the common traditional equilibrium isotherms like Langmuir and Freundlich models (Li et al., 2019). However, the attained parameters from the application of these traditional models are not sufficient to better understand the uptake mechanism (Selim et al., 2019). For example, the adsorbent surface homogeneity and heterogeneity are recognized via the Langmuir or Freundlich equation, respectively, without a distinct physical meaning (Mobarak et al., 2019). Thus, the use of advanced statistical physics modeling (ASPM) in fitting the experimental data is vital to offer physicochemical significance for the steric and energetic factors (Mohamed et al., 2019). Determination of these parameters is the cornerstone in the clarification of the scavenging mechanism (Mobarak et al., 2019).

Recently, nanoparticle-modified materials were used to develop adsorbents having a large surface area, multiple reactive sites, and high regeneration efficiency (Youssef et al., 2019). Silica ($SiO_2$) based composites have been used and explored for the various environmental applications due to its unique characteristics (Ordinartsev et al., 2018).

Improved composites for the enhanced adsorption of metal ions from water are needed.

SUMMARY

Described herein is a graphene oxide/$SiO_2$@polyaniline microsphere composite that can be used for scavenging both cationic and anionic metal ions from water at various pH conditions, temperatures, initial metal ion concentrations, and equilibrium times.

An aspect of the disclosure provides a composite for adsorption of metal ions, comprising silica microparticles, graphene oxide sheets, and polyaniline, wherein the graphene oxide sheets and polyaniline are distributed on a surface of the silica microparticles. In some embodiments, the graphene oxide sheets and polyaniline are non-uniformly distributed on the surface of the silica microparticles. In some embodiments, the graphene oxide sheets comprise 10-20 wt % of the composite. In some embodiments, the polyaniline comprises 5-15 wt % of the composite.

Another aspect of the disclosure provides a method for removing metal ions from a solution, comprising contacting the solution with the composite of claim 1 under conditions suitable for adsorption of metal ions to the composite and recovering the composite from the solution. In some embodiments, the method further comprises removing the adsorbed metal ions from the composite to provide a recycled composite. In some embodiments, the method further comprises contacting a solution comprising metal ions with the recycled composite under conditions suitable for adsorption of metal ions to the composite. In some embodiments, the solution is an aqueous solution. In some embodiments, the metal ions include cationic and anionic metal ions. In some embodiments, the metal ions comprise at least one of cationic Cu(II) and anionic Cr(VI) metal ions. In some embodiments, the metal ions include each of cationic Cu(II) and anionic Cr(VI) metal ions. In some embodiments, the pH of the solution is maintained between 2-6 during the contacting step.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 2A-E. XPS analysis of GO/$SiO_2$@PANI composite, (a) wide scan survey, (b) Si 2p, (c) C 1s, (d) N 1s, and (e) O1s.

FIGS. 9A-C. (a) Cu(II)/Cr(VI) co-adsorption studies at different solution pH, (b) role of ionic salt on Cu(II) and Cr(VI) adsorption and (c) regeneration of GO/SiO$_2$@PANI composites (desorbent: 0.01 M HCl for Cu(II) and 0.01 M NaOH for Cr(VI), metal concentration: 500 mg/L, contact time: 5 h, Temperature: 30° C., adsorbent mass: 0.02 g, volume: 20 mL, pH 5.3 for Cu(II) and pH 3 for Cr(VI)).

DETAILED DESCRIPTION

Embodiments of the disclosure provide compositions and methods for the enhanced adsorption of both cationic and anionic metal ions from a solution such as contaminated wastewater.

Figure 10:
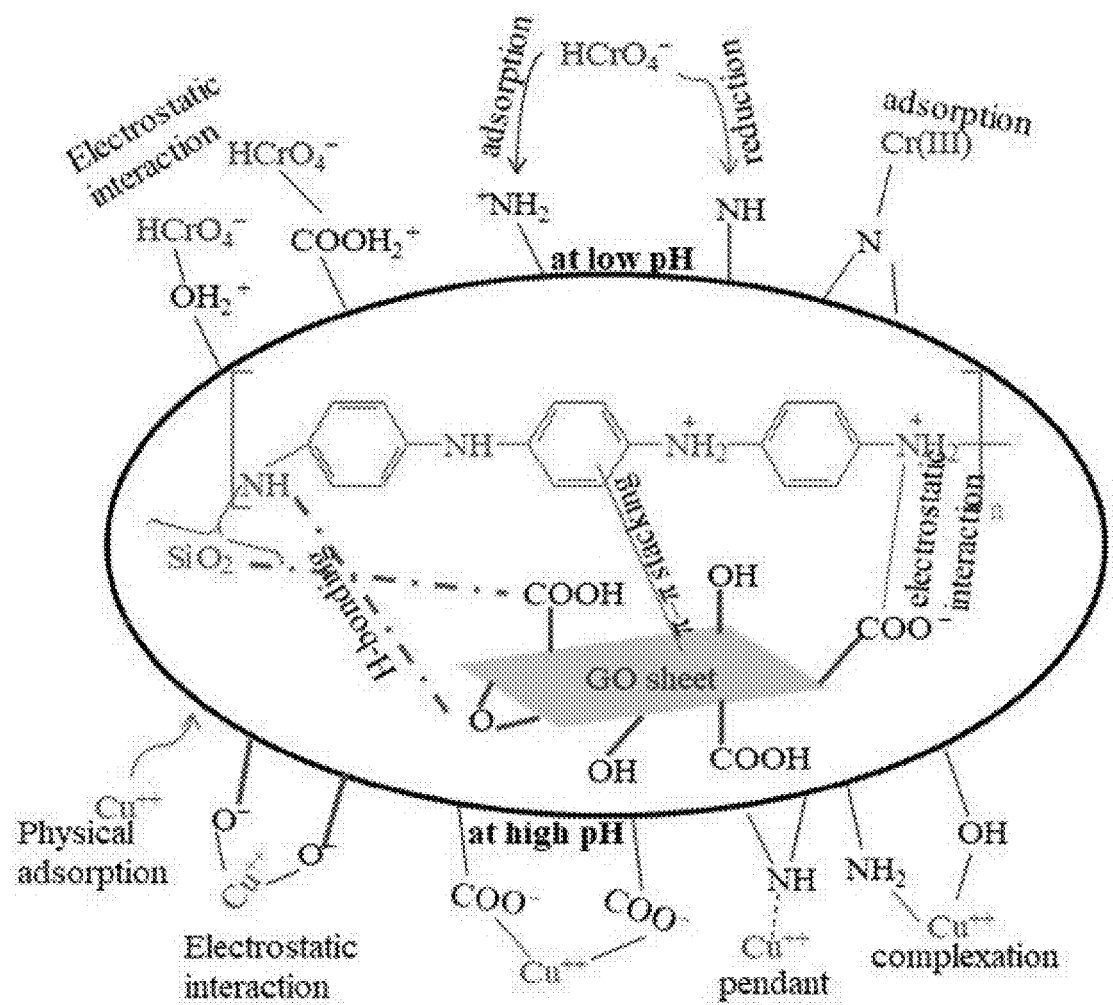
FIG. 10. Illustration of the interaction of metal ions with a GO/SiO$_2$@PANI composite.

With reference to FIG. 10, a composite as described herein comprises silica microparticles, graphene oxide sheets, and polyaniline. The graphene oxide sheets and polyaniline are distributed on a surface of the silica microparticles.

Silica (also referred to as silicon dioxide or SiO$_2$) is a highly ordered material comprising a two-dimensional array of channels and is efficient for the adsorption of heavy metals due to an extended surface area. A composite as described herein may include silica from about 65-75 wt %, e.g. 70-74 wt %, e.g. about 72.611 wt %.

The term "microparticles" refers to particles having a diameter of typically less than 1.0 mm. The microparticles described herein include, but are not limited to, microspheres, microcapsules, microsponges, microgranules and particles in general. The term "microparticles" may include nanoparticles. In some embodiments, the silica particles have a size from 80-300 nm. In some embodiments, the composite has a size from 100-500 nm, e.g. 200-400 nm.

Graphene oxide (GO) is a compound of carbon, oxygen, and hydrogen in variable ratios, obtained by treating graphite with strong oxidizers. The maximally oxidized bulk product is a yellow solid with C:O ratio between 2.1 and 2.9, that retains the layer structure of graphite but with a much larger and irregular spacing. The bulk material spontaneously disperses in basic solutions or can be dispersed by sonication in polar solvents to yield monomolecular sheets, the single-layer form of graphite. GO has a large surface area of about 2600 m$^2$/g, extraordinary electrical, thermal and mechanical properties including 3000 W m/K thermal conductivity, and a hydrophilic nature. As used herein "graphene oxide" does not include reduced graphene oxide.

A description of GO sheet structure is given by a model updated by Gao et al. (*Nat Chem,* 2009). This model represents each GO particle by the basal plane of sp$^3$ hybridized carbon atoms with chemically bonded hydroxyl and epoxy functional groups situated in close proximity to each other on both sides of the plane. Edges of basal plane are terminated by carboxyl groups five or six membered lactol (O—C—O) rings, ketone and ester of tertiary alcohol. The mean content of edge functionalities inversely depends on the size of GO particles.

Polyaniline (PAM) is a conductive polymer of the semi-flexible rod polymer family having selectivity to certain metal ions due to its multi-redox reactions, excellent electronic properties, and high thermal stability. Polymerized from aniline, polyaniline can be found in one of three oxidation states: leucoemeraldine (fully reduced), emeraldine, and pernigraniline (fully oxidized with imine links instead of amine links). Embodiments include any one of the three states or mixtures of two or three of the states. Polyaniline may be produced, for example, in the form of long-chain polymer aggregates, surfactant (or dopant) stabilized nanoparticle dispersions, or as stabilizer-free nanofiber dispersions.

A composite described herein may comprise graphene oxide sheets and polyaniline distributed on a surface of the silica microparticles. In some embodiments, the graphene oxide sheets and polyaniline are non-uniformly distributed on the surface of the silica microparticles.

Embodiments provide a low density deposition of polyaniline and GO on the surface of silica to avoid the blockage of the active sites on silica. In some embodiments, a composite as described herein may include GO from about 10-20 wt %, e.g. about 12-16 wt %, e.g. about 14.522 wt %. In some embodiments, the polyaniline comprises about 5-15 wt %, e.g. about 10-14 wt %, e.g. about 12.867 wt % of the composite.

Embodiments include methods of preparing a composite as described herein. The composite may be synthesized via a one step process, e.g. prepared by in situ aniline polymerization in the existence of GO and SiO$_2$.

Embodiments also provide methods for removing metal ions from a solution, e.g. an aqueous solution, using a composite as described herein. Exemplary sources of water can be any of a ground water source, an industrial source, a municipal source, water source and/or a combination thereof.

The solution may comprise at least 50 mg/L of metal ions, e.g. at least about 100, 200, 300, or 400 mg/L. The solution may be contacted with (e.g. mixed with) the composite under conditions suitable for adsorption of metal ions to the composite. Suitable conditions may include maintaining the solution at a pH of 2 to 6, e.g. about 3 to 5.5. In some embodiments, the solution is maintained at a temperature of 25 to 55° C., e.g. about 30 to 50° C. In some embodiments, the contacting step is performed for 15 to 420 minutes, e.g. about 200 to 300 minutes before recovering the composite from the solution.

The composite may be recovered using a filter, e.g. a 0.02 μm syringe membrane filter. After recovery, the adsorbed metal ions may be removed from the composite to provide a recycled composite that may be reused for adsorping and removing metal ions from a solution. In some embodiments, the metal ions are removed using an eluent comprising HCl and NaOH.

Metal ions that may be adsorbed with a composite as described herein include both cationic and anionic metal ions. In some embodiments, the metal ions comprise at least one of cationic copper (Cu(II)) and anionic chromium (Cr(VI)) metal ions. In some embodiments, the metal ions include each of cationic Cu(II) and anionic Cr(VI) metal ions. Other suitable metal ions include, but are not limited to, lead (Pb(II)), manganese (Mn(II)), nickel (Ni(II)), cadmium (Cd(II)), and mercury (Hg(II)).

In some embodiments, the uptake/adsorption of metal ions with the composite exceeds about 35% or more, e.g. about 40%, 45%, 50%, 55%, 60%, 65% or more.

In some embodiments, the adsorbent composite is incorporated into a filter to remove heavy metals from contaminated water. The filter can be designed in variety of forms, e.g. comprising a candle, a porous block (radial and/or vertical), a filter bed, a packet, a bag and the like.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

Example

Summary

Recently, the discharge of metal ions into aquatic environments has become an important issue because of its role in the ecological system pollution. Herein, a recyclable multifunctional graphene oxide/silica@polyaniline (GO/SiO2@PANI) microsphere composite was synthesized, characterized, and tested for Cu(II) and Cr(VI) ions uptake. The interaction between the studied ions and GO/SiO2@PANI composite was rapid, and the optimum pH values were 5.3 for Cu(II) and pH 3.0 for Cr(VI). The Cu(II)) and Cr(VI) adsorption data at equilibrium reflected proper corrections for traditional Langmuir and Freundlich equations at 30, 40, and 50° C. Fourier-transform infrared spectroscopy (FTIR) and X-ray photoelectron spectroscopy (XPS) analysis revealed that the Cu(II) adsorption onto GO/SiO2@PANI function groups was mainly governed by electrostatic force.

Hexavalent chromium was removed in the form of $HCrO_4$ via electrostatic interaction and Cr(III) by the ion exchange. The geometry of the removed ions on the GO/SiO2@PANI receptor sites was deeply interpreted using advanced statistical physics models (ASPM). Single and two-layer with dual-energy sites fitted perfectly with Cr(VI) as well as Cu(II) sorption data. Horizontal and vertical directions were presented in Cr(VI) uptake, indicating the presence of adsorption reduction coupled mechanism. For Cu(II) ions, only the horizontal position was distinguished, reflecting the participation of various receptor sites of the GO/SiO2@PANI in the removal of copper ion. The adsorption energies for both metal ions were below 40 kJ/mol signifying an endothermic process governed by physical interactions. Removal of both ions in the binary system and regeneration process indicated that the GO/SiO2@PANI composite is an efficient adsorbent for metals-bearing water.

Materials and Methods

Chemicals

Sodium lauryl sulfate (SDS) and tetraethyl orthosilicate (TEOS) were purchased from Scharlab S.L., Spain. Graphite, potassium dichromate (K2Cr2O7), aniline, and copper sulfate (CuSO4) were obtained from BHD chemical Ltd, Poole, England. The oxidant ammonium persulfate was purchased SD Fine Chemicals, India.

Synthesis of SiO2, GO, Polyaniline and GO/SiO2@Polyaniline Composite

Initially, a 50 mL mixture of ethanol and water (25 mL each) containing 1.3 g of SDS was prepared under continuous stirring. Thereafter, 3.5 mL TEOS was added to the prepared SDS solution. After 30 min of stirring, 12 mL NH4OH was added dropwise with stirring until the formation of a precipitate with white color. This precipitate was transferred in a hydrothermal reactor and kept in an oven for 24 h at 140° C. After cooling the reactor, the obtained white material was thoroughly cleaned with deionized water to eliminate the SDS. Then, the resulting silica product was subjected to washing again with 30 mL ethanol and 30 mL acetone before drying at 105° C. for 24 h.

The graphene oxide (GO) was synthesized by Hummers' method as reported elsewhere (Jilani et al., 2017).

GO/SiO2@PANI composite was prepared by in situ aniline polymerization in the existence of GO and SiO2. Initially, 2 mL GO (0.05 mg/mL) was mixed in 100 mL 1.0 M HCl solution and stirred for 30 min. Then, 10 mL chloroform, 0.5 g SiO2, and 0.5 mL aniline were mixed to the GO solution. After 30 min stirring in an ice bath, 25 mL $(NH_4)2 S_2O_8$ prepared in 1.0 M HCl was added until a greenish blue precipitate was obtained. After 16 h stirring, the composite material was filtered and washed with deionized water, acetone and ethanol. The synthesized GO/SiO2@PANI composite was transferred to the air dryer for 16 h at 80° C. In the absence of SiO2 and GO, pure polyaniline was prepared by the above method used for the synthesis of GO/SiO2@PANI composite.

Characterization

JSM-7500 F, JEOL, Japan, scanning electron microscopy was used for surface texture and morphology analysis of the SiO2 and GO/SiO2@PANI microsphere composite. The deposition of GO and PANI onto SiO2 was analyzed by FEI Tecni G2 F20 (FEI. Co, USA) transmission electron microscopy. Quantachrome® Autosorb-1 surface area analyser (Quantachrome, USA) was used for the specific surface area measurement of SiO2 and GO/SiO2@PANI. The XRD and XPS (step size 1 eV) analysis were recorded on a Ultima-IV, Rigaku Corporation, Japan and SPECS GmbH, spectrometer (Germany).

Adsorption Experiments

The impact of starting Cu(II) and Cr(VI) concentrations, pH value, shaking time, and solution temperature have been examined in batch mode. A fixed-dose (0.02 g) of the prepared materials was mixed with the 20 mL solution of 500 mg/L concentration of the tested ions. Solution pH was fixed between 2.0 to 5.5 for Cu(II) and 2.0 to 9.0 for Cr(VI). This adsorption pH experiment was conducted at 30° C. and 300 min of contact time. At temperatures 30, 40, and 50° C., the initial metal concentrations (50-700 mg/L) effect were also investigated by mixing 0.02 g adsorbent with 20 mL of the metal ion solution. The equilibrium time analysis experiment was performed between 15 and 420 min at 500 mg/L concentration at the fixed pH and dose of materials. UV-Visible DR-6000 spectrophotometer (HACH Germany) was applied for the analysis of copper and chromate ions in solution. The specified HACH kits, CuVer® 1 copper reagent (bicinchoninate method) and LCK 313 cuvette test for total chromium analysis kits provided by HACH Germany were used for the analysis of copper and total chromium (III and VI). The uptake capacities of the applied materials for the investigated ions were calculated at equilibrium ($q_e$) and at a time ($q_t$). The adsorption experiments were repeated three times and average values are reported.

Classical Isotherm Modeling

Equilibrium traditional models (Langmuir, 1916) and (Freundlich, 1906) were used in fitting the resulted Cu(II) and Cr(VI) uptake data. The nonelinear equations for both applied isotherm models, and the values of their parameters were tabulated.

Statistical Modeling Analysis

Several advanced statistical models were evaluated in fitting the scavenging of chromate and copper ions onto GO/SiO2@PANI composite. The assumptions and approaches of these advanced models were deeply discussed in formerly published studies (Li et al., 2019; Selim et al., 2019).

Results and Discussion

Material Synthesis and Characterization

Herein, a small amount of the aniline and GO was for the deposition onto the SiO2 microspheres to avoid the complete blockage of the porosity of the substrate SiO2. Some of the previous studies reported the interaction between GO and PANI though chemical bonding, hydrogen bonding, pep interactions and electrostatic interactions (Wang et al., 2009), although, bonding between GO and PANI is not very definite. Moreover, the polar groups, oxygenated groups of the GO, SiO2 and PANI may form coordinate or ionic complexes with each other in the GO/SiO2@PANI composite (Vargas et al., 2017).

SEM images of the developed SiO2 (pure) and composite microspheres are displayed in FIG. 1. The porous spherical structure of SiO2 particles is shown (FIG. 1a), while spherical silica particles with the non-uniformly distributed GO nanosheets and PANI patches are displayed in GO/SiO2@PANI composite (FIG. 1b). The sheet like morphology of the GO is confirmed by the SEM and TEM images. The TEM image of GO shows the few layered nanosheet structure. The highly porous SiO2 structure coated by GO and PANI is clearly seen in the TEM image (FIG. 1c). The GO and PANI is not distributed uniformly due to use of low amount of the GO and aniline during synthesis of GO/SiO2@PANI composite. The patches of GO/PANI onto SiO2 surface can be clearly seen in FIG. 1c. The deposition of GO with distinct layered structures and the thin transparent layer of PANI onto the spherical SiO2 particles confirms the successful preparation of GO/SiO2@PANI composite (FIGS. 1b and c).

Figure 1A:
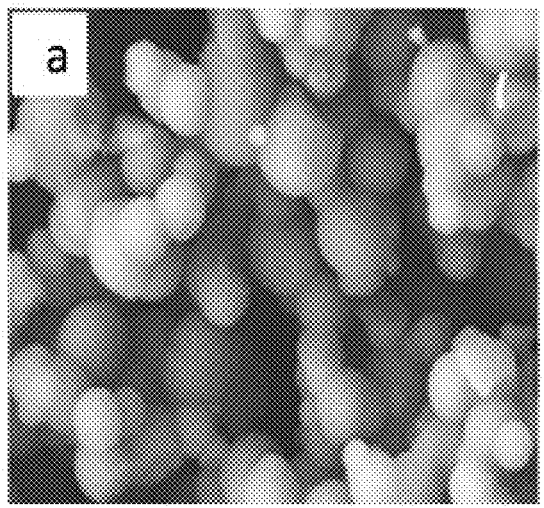
FIGS. 1A-D. SEM images of (a) $SiO_2$ particles, (b) GO/$SiO_2$@PANI composite, (c) TEM image of GO/$SiO_2$@PANI composite, and (d) XRD patterns of $SiO_2$ and GO/$SiO_2$@PANI composite.
Figure 1B:
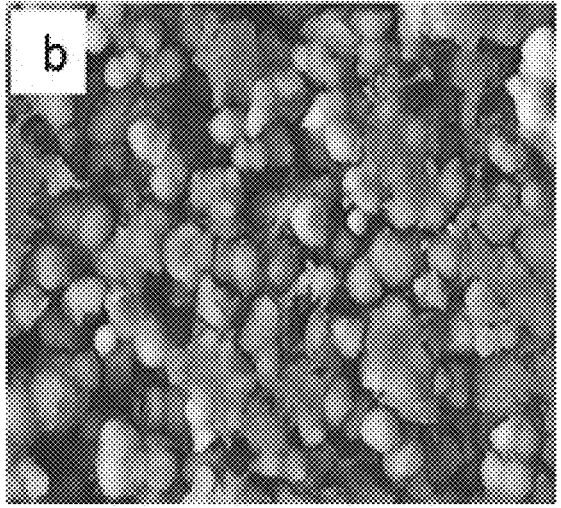
Figure 1C:
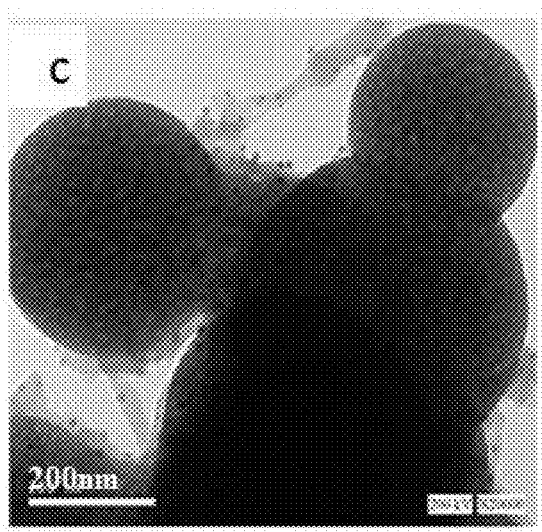
Figure 1D:
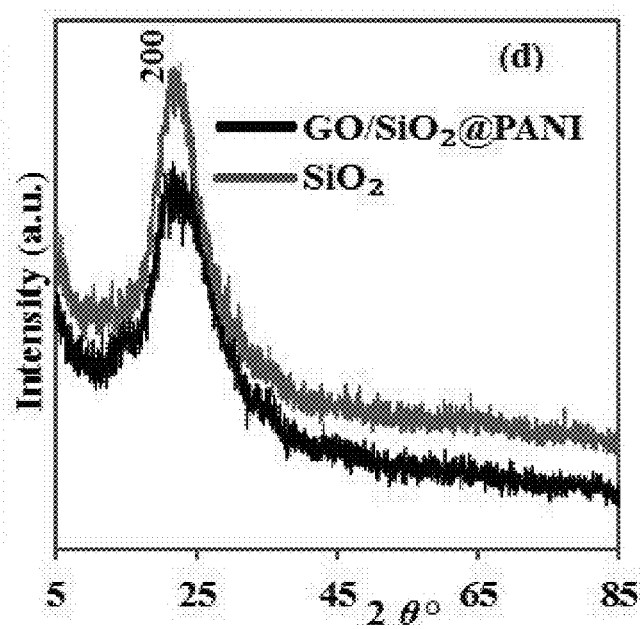

The XRD pattern of SiO2 (FIG. 1d) was characterized by the detection of a strong reflection peak at 2θ=22° of SiO2, which is in the form of tridymite (JCPD card no. 01-073-6614). The XRD pattern of the pure GO sheets shows the characteristic peak at 11.6° (001) confirming the successful synthesis. The XRD pattern of GO/SiO2@PANI composite was closely matching with that of SiO2 due to the dominating effect of SiO2 (FIG. 1d). However, the peak for GO/SiO2@PANI composite was much broader and lower in intensity compared to the pure SiO2. The amorphous nature of PANI and the low amount of GO were the main factors causing the absence of the detected peaks for GO/SiO2@PANI composite (Barakat et al., 2019; Zhang and Choi, 2012; Zhang et al., 2010).

Table 1 summarizes the textural parameters of pure SiO2 and GO/SiO2@PANI microsphere composite. Pure SiO2 displayed a high specific surface area (224.99 $m^2$/g) as compared to GO/SiO2@PANI composite (150.36 m2/g). This insignificant decrease in the surface area could be ascribed to PANI coating, which blocked the pores in SiO2 particles. Moreover, the average pore size of SiO2 was slightly low compared to GO/SiO2@PANI composite.

TABLE 1

Textural properties of SiO$_2$ and GO/SiO2@PANI composite.

| Material | Specific surface area (m$^2$/g) | Volume of pores (cm$^3$/g) | Average pore size (nm) |
|---|---|---|---|
| SiO$_2$ | 224.99 | 0.012 | 9.08 |
| GO/SiO$_2$@PANI | 150.36 | 0.007 | 9.32 |

FIG. 2 demonstrates a comprehensive XPS analysis of GO/SiO2@PANI microspheres. The wide scan survey in FIG. 2a showing the peaks for O 1s, N 1s, C 1s, and Si 2p, at their respective binding energies (BE) of 532.66, 397.52, 284.56, and 103.71 eV, respectively. The deconvoluted Si 2p peak (FIG. 2b) shows a strong peak for Si—O group at 103.67 eV and the small peak at 101.04 eV, reflecting the interaction between Si and C in the studied composite. The deconvoluted C 1s represented the occurrence of several peaks for different carbon functional groups such as C=C (283.82 eV) and Ce—C/Ce—H (284.8 eV) for sp$^2$ carbon, while CC (285.55 eV) for sp$^3$ carbon. FIG. 2d shows the deconvoluted spectra for N is belongs to the PANI and the peaks for the amine and imine groups (in benzenoid and quinoid) i.e., N=/C=N—C and N—H-/pyridinic N appeared at 397.59 and 399.91 eV (Bhaumik et al., 2014). The peaks for O is oxygenous functional groups i.e., O—C, O—C—H, O=C and O—H (FIG. 2e) appeared at 531.5, 532.78, and 533.65 eV. These results confirmed the successful disposition of the PANI onto GO/SiO2.

Role of pH on Metal Uptake

Figures 3A, 3B, 3C:
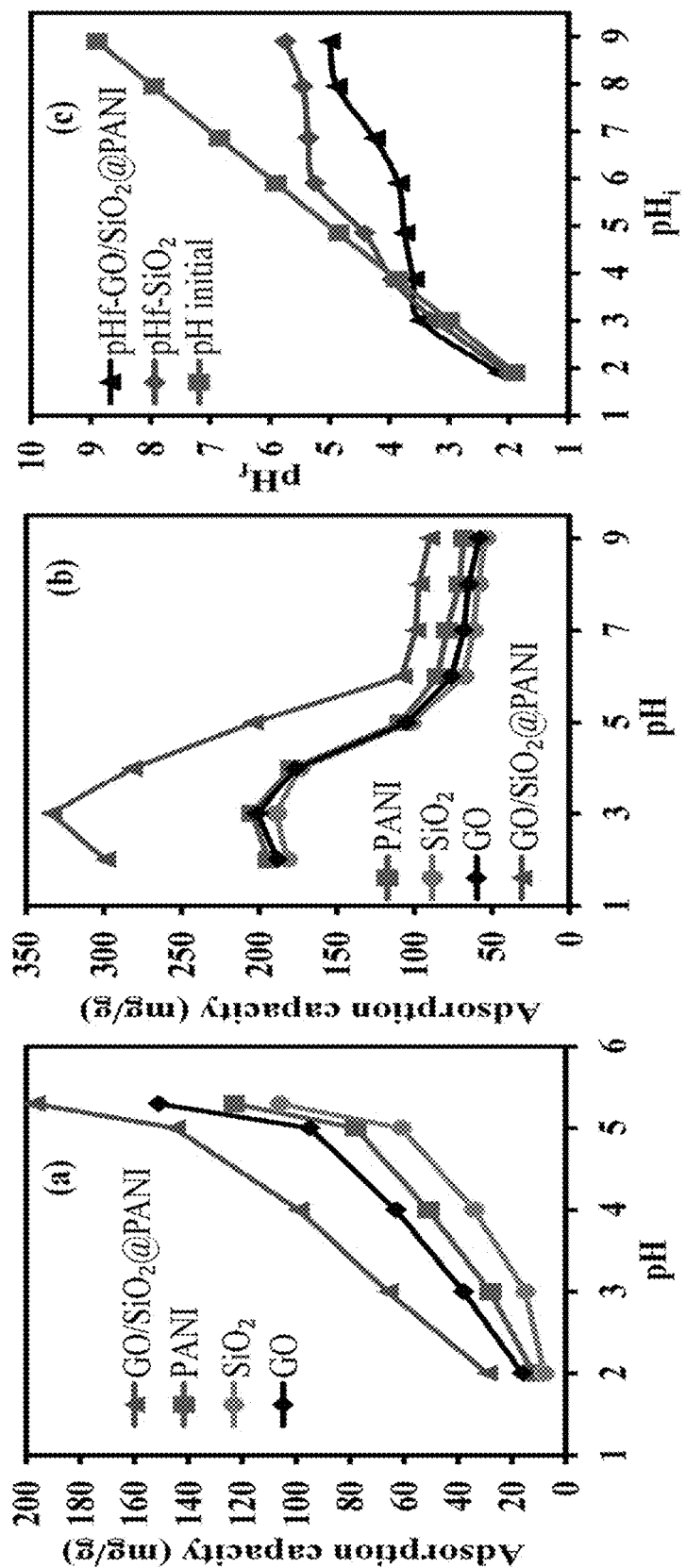
FIGS. 3A-C. Effect of solution pH on the adsorption of metal ions (a) Cu(II) (b) Cr(VI) (c) surface charge analysis of $SiO_2$ and GO/$SiO_2$@PANI composite, (pHi—initial solution pH and pHf—final solution pH). (metal concentration: 500 mg/L, time: 5 h, temperature: 30° C., volume: 20 mL, and adsorbent mass: 0.02 g).

The scavenging of Cu(II) was investigated between pH 2 to 5.5 to avoid its precipitation in the form of Cu(OH)2 at pH value >5.5 (Ma et al., 2014; Da'na and Sayari, 2013). While for Cr(VI), the pH 2.0-9.0 was selected to study the interaction between different chromium species and the studied materials. The role of solution pH on both metal removal by SiO2, GO, PANI, and GO/SiO2@PANI composite was shown (FIGS. 3a and b). Moreover, the zero charge point (pH$_{zpc}$) of the SiO2 (the dominant solid in the composite) and GO/SiO2@PANI were resulted to be pH 4.2 and pH 3.6, respectively, as illustrated in FIG. 3c. Based on the pH experiment, the best adsorbent can be determined, and its adsorption behavior was evaluated in detail as given in the following parts.

The obtained results indicated that GO/SiO2@PANI composite was the most efficient material for both metals as compared to its components. This was mainly due to multifunctional groups on the composite. Generally, with rising solution pH value, Cu(II) and Cr(VI) sequestering onto studied materials increased and decreased, respectively. The surface charge of both metal ions and pH$_{zpc}$ of the materials is mainly responsible for the opposite adsorption trend. As the pH$_{zpc}$ analysis revealed that the GO/SiO2@PANI composite surface showed the zero surface charge at pH 3.6. This indicated that GO/SiO2@PANI composite surface becomes anionic >pH 3.6, and thus, Cu(II) adsorption was sharply increased above the solution pH 3.6, as shown in FIG. 3c (Srivastava et al., 2015). The optimum Cr(VI) adsorption was detected at pH 3.0 due to electrostatic binding of chromate ions and protonated adsorbent surface. The existence of Cr(VI) in different ionic forms, i.e. H$_2$CrO$_4$ (pH<1), HCrO$_4^-$ (pH 1-6.5), CrO$_4^{2-}$, Cr$_2$O$_7^{2-}$ and HCr$_2$O$_4^-$ (pH>6.51) based on the pH value. At solution pH 3.0, the GO/SiO2@PANI composite surface was highly protonated, which causes high adsorption of Cr(VI) via electrostatic interaction (Mohamed et al., 2020). In addition, a reduction of HCrO$_4^-$ might occur at the pH range 2.0-6.0, $$HCrO_4^- + 7H^+ + 3e^- \rightarrow Cr^{3+} + 4H_2O \tag{1}$$

Therefore, Cr$^{3+}$ can be adsorbed on basic GO/SiO2@PANI composite functional groups as follows:

$$\equiv M\text{-}OH + Cr^{3+} \rightarrow \equiv M\text{-}OHCr^{3+} \tag{2}$$

≡M indicates the accessible active sites for ions adsorption. Above the pH$_{zpc}$ 3.6, GO/SiO2@PANI composite surface becomes negative, which showed the electrostatic repulsion with negatively charges chromium species. Therefore, the interaction of the Cr(VI) with GO/SiO2@PANI composite surface decreased intensely with the surge in solution pH (Kumar et al., 2017; Tian et al., 2015).

The comparative sequestering studies of all the prepared materials for Cu(II) and Cr(VI) indicated that GO/SiO2@PANI composite was the most efficient material and therefore, GO/SiO2@PANI composite was selected for the further adsorption studies at the optimum solution pH for both metal ions.

Equilibrium Time and Kinetics Analysis

Figures 4A, 4B, 4C:
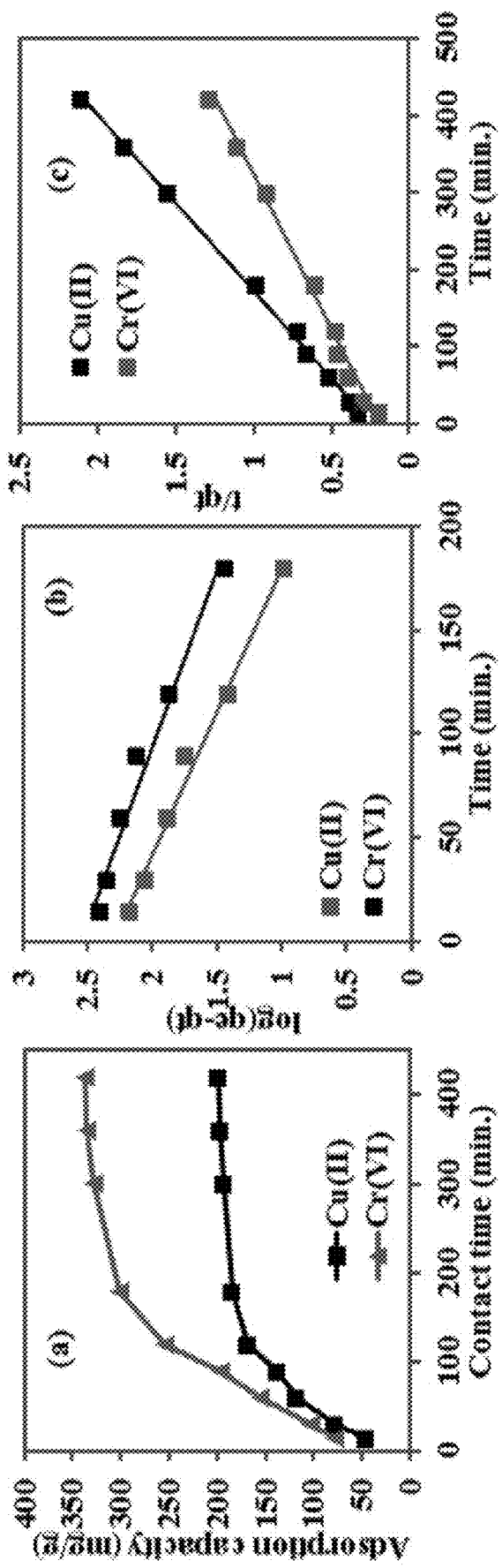
FIGS. 4A-C. (a) Adsorption of Cu(II) and Cr(VI) onto GO/$SiO_2$@PANI composite at different contact time, (b) Pseudo-first-order kinetic model, and (c) Pseudo-second-order kinetic model (metal concentration: 500 mg/L, temperature: 30° C., adsorbent mass: 0.02 g, volume: 20 mL, pH 5.3 for Cu(II), and pH 3.0 for Cr(VI).

To optimize the equilibrium time, experiments of Cu(II) and C(VI) uptake were studied at time intervals ranging from 15 to 420 min using 500 mg/L of metal concentrations, and 0.02 g of the composite mass. The obtained results revealed that both metals ions adsorption onto GO/SiO2@PANI composite was rapidly increased at the initial stage (15<t<200 min) of the experiment and then increased gradually (the second stage) from 200 to 300 min (FIG. 4a). The removal capacities for both metals have not been changed significantly after 300 min. In the beginning, the adsorption rate was high due to the accessible free sites on GO/SiO2@PANI composite. The gradual increase of the second stage was due to the pore diffusion of metal ions from the outer layer to the inner pores of GO/SiO2@PANI (Shen et al., 2009). Finally, the last period demonstrating the equilibrium state of both metals adsorption onto the synthetic composite (Shen et al., 2009). At the equilibrium, the uptake of Cu(II) and Cr(VI) by GO/SiO2@PANI composite was 39.6% (189.9 mg/g) and 67.5% (337.5 mg/g), respectively.

The metal ion sequestering rate by GO/SiO2@PANI composite was determined by pseudo-first-order and pseudo-second-order kinetic models. FIG. 4 b and c show the linear plots for both dynamic models, and the obtained values were tabulated in Table 2. The correlation coefficient (R2) values 0.9891 and 0.9702 were attained from the pseudo-first-order, while 0.9981 and 0.9926 resulted from the pseudo-second-order for both contaminant adsorption, respectively. The R2 values indicated that the adsorbed metal ions were applicable for both kinetic models. Moreover, the calculated adsorption amounts for the pseudo-first-order equation were almost the same as the adsorption capacity obtained experimentally for both metals. These results indicated that the scavenging of both metals onto GO/SiO2@PANI was directed to the pseudo-firstorder kinetic model.

TABLE 2

Kinetic parameters for the adsorption of
Cu(II) and Cr(VI) onto GO/SiO$_2$@PANI composite.

| | Pseudo-first-order | | | Pseudo-second-order | | |
|---|---|---|---|---|---|---|
| Adsorbate | $q_e$ (mg/g) | $k_1$ (1/min.) | $R^2$ | $q_e$ (mg/g) | $k_2$ (g/mg.min) | $R^2$ |
| Cu(II) | 198.88 | 0.01658 | 0.9891 | 227.27 | 0.000794 | 0.9981 |
| Cr(VI) | 355.39 | 0.01358 | 0.9702 | 416.66 | 0.0000290 | 0.9926 |

Role of initial Cu(II) and Cr(VI) concentrations

Figure 5A:
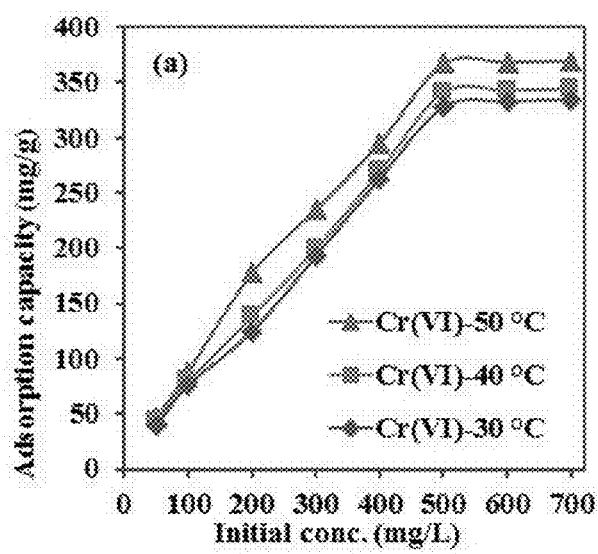
FIGS. 5A-B. Role of initial metal concentrations on the adsorption of (a) Cr(VI) and (b) Cu(II) onto GO/SiO$_2$@PANI composite at different solution temperatures (adsorbent mass: 0.02 g, volume: 20 mL, pH 5.3 for Cu(II), and pH 3.0 for Cr(VI).
Figure 5B:
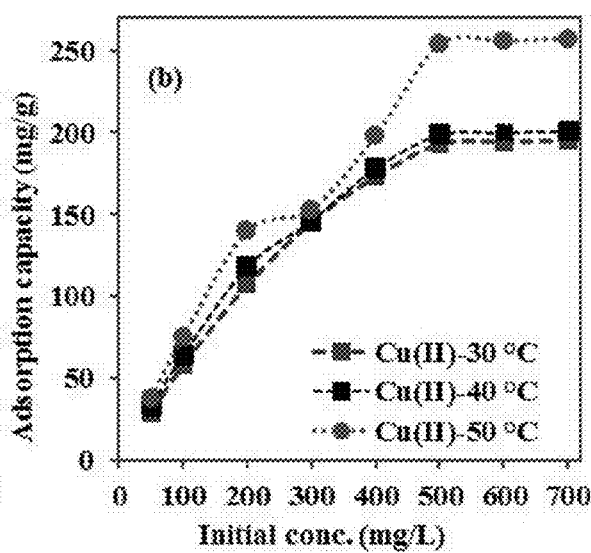

The role of primary metal ions concentrations between 50 and 700 mg/L on the adsorption onto GO/SiO2@PANI composite was investigated (FIG. 5). The adsorption capacity of GO/SiO2@PANI composite for both metals increased sharply up to 500 mg/L concentration, due to the existence of free sites on GO/SiO2@PANI composite. In other words, the freely available sites were large in number compared to the existing metal ions in the solution, hence, adsorption of both metal ions was not dependent on initial low concentrations. At the higher concentration, the ratio of free sites on material to initial metal ions concentration was low and the adsorption depends on the initial metal concentrations (ALOthman et al., 2013). Therefore, further increment in either Cu(II) or Cr(VI) concentrations, no significant increase in adsorption, which reflects the saturation of active sites of GO/SiO2@PANI composite.

The results in FIG. 5 also reveal that the adsorption of both metal ions increases with the rise in the solution temperature from 30° C. to 50° C. A higher temperature may increase the porosity of the GO/SiO2@PANI composite and reduce the viscosity of the metal solution which facilities diffusion of the ions into the pores, resulting in the enhanced adsorption capacity. These results demonstrate that adsorption of Cu(II) and Cr(VI) onto GO/SiO2@PANI composite was endotherm in nature (Alqadami et al., 2018).

Adsorption Mechanism

FTIR and XPS

Figure 6A:
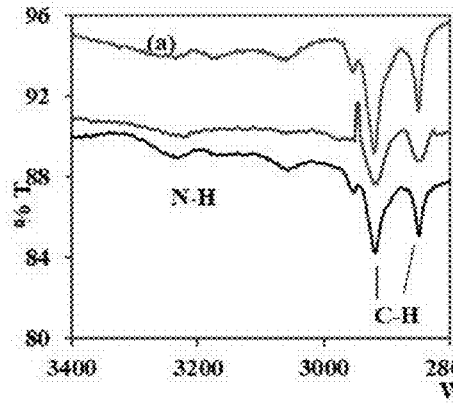
FIGS. 6A-E. FTIR spectra of GO/SiO$_2$@PANI composites (a) before and (b) after Cu(II) and Cr(VI) adsorption, (c) XPS analysis scan survey of GO/SiO$_2$@PANI composites after Cu(II) and Cr(VI) adsorption, (d) deconvoluted Cu 2p, and (e) deconvoluted Cr 2p.
Figure 6B:
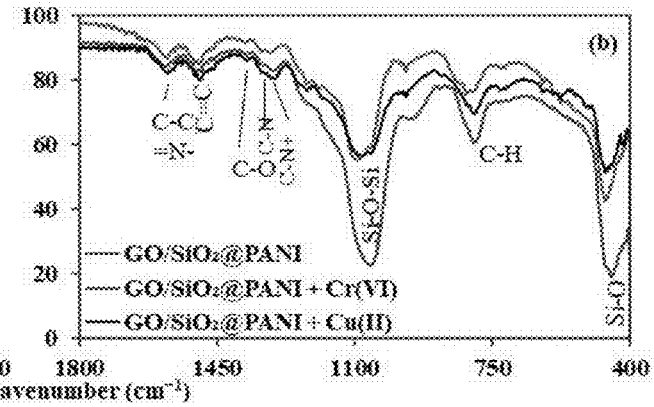
Figure 6C:
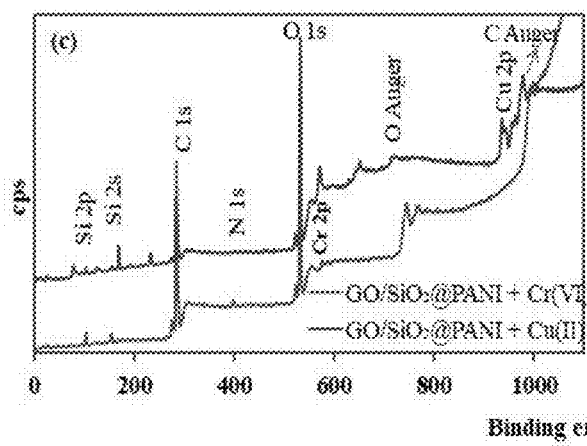
Figure 6D:
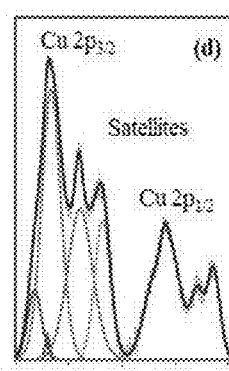

The variation of the detected functional groups and the charge of metal ions play an important role in the adsorption mechanism (Gao et al., 2009). Generally, electrostatic interaction, precipitation, reduction, complexation, ion-exchange are mainly contributed to the scavenging and separation process. Herein, the binding between the studied Cu(II) and Cr(VI) ions with GO/SiO2@PANI composite was investigated using FTIR (FIG. 6 a,b) and XPS analysis (FIG. 6 c-d). A wide peak appeared between 3300 and 3200 cm$^{-1}$ belonging to the N—H group of the PANI. The peak for C—H band from PANI and GO appeared at around 2900-2800 cm$^{-1}$ (FIG. 6a). The FTIR spectrum of GO/SiO2@PANI composite shows wide peaks at 1590 and 1530 cm$^{-1}$ belonging to N quinine in PANI and C—C starching. The bands appearing at 1472 and 1310 cm$^{-1}$ are allied with a benzene ring (C=C) and C—N in the PANI. The strong band for C—H group in PANI ring appeared at 782 cm$^{-1}$. The band at around 1300 cm$^{-1}$ also showed for the epoxy group from GO (Szabo et al., 2006). The bands at around 1000 cm$^{-1}$ and 450 cm$^{-1}$ were associated with Si—O—Si and Si—O vibration (Szabo et al., 2006).

Moreover, the band for Si—OH groups revealed that a compressed SiO2 network preserved in GO/SiO2@PANI after the fabrication and functionalization (Yoo et al., 2006; Zhang and Choi, 2012). On the other hand, all the observed bands of GO/SiO2@PANI composite after Cu(II) and Cr(VI) binding were slightly shifted due to the interaction with metal ions. The peaks for —OH, —NH, —NH2, —COOH groups were moved to low intensity, revealing the role of these groups in the adsorption of Cu(II) as well as Cr(VI) onto GO/SiO2@PANI composite.

The binding of both metal ions onto GO/SiO2@PANI was further investigated by XPS analysis, and spectra are depicted in FIG. 6 c, d, and e. The survey scan spectra of GO/SiO2@PANI after adsorption of both metals represented the peaks for the N 1s, O 1s, C 1s, and Si 2p, along with Cu 2p and Cr 2p (FIG. 6c). The slight change in the binding energies and the appearance of new peaks for the Cu 2p (935.66 eV) and Cr 2p (576.57 eV) confirmed the interaction between the metal ions and GO/SiO2@PANI composite. The deconvoluted Cu 2p peak for adsorbed Cu(II) exhibited the peaks at 932.31, 933.33, 935.5, 941.51, and 945.31 eV (FIG. 6d). The peak at 933.33 eV was related to bonded CuO ((C/Si—O$^-$)$_2$—Cu$^{2+}$) while the peaks at 932.31, 941.41 and 945.31 eV were attributed to the interaction between Cu and N (deprotonated amine group) (Zhou et al., 2018; Xu et al., 2017). The highest sequestering of Cu(II) was observed at pH 5.3 (i.e. >pHzpc) due to electrostatic interactions between the deprotonated hydroxyl, carboxylic, and amine groups of the GO/SiO2@PANI. Besides the electrostatic interaction and complexation, adsorption of Cu(II) can be considered through the cation-p interaction. The GO/SiO2@PANI contains the electron-rich domains on the aromatic rings, and Cu(II) can bind with GO/SiO2@PANI via cation-p interaction (Zhou et al., 2018).

Figure 6E:
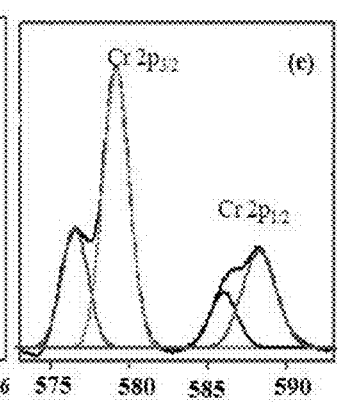
Figure 7A:
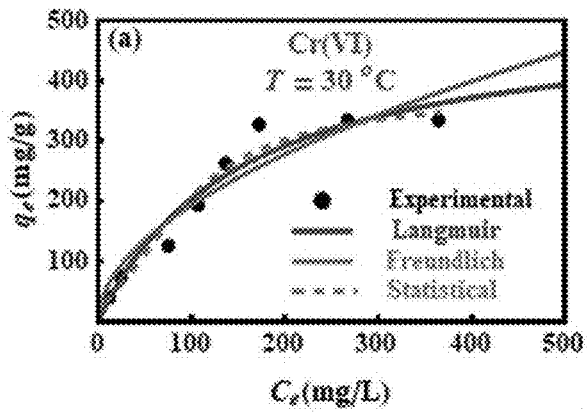
FIGS. 7A-F. Non-linear Langmuir, Freundlich, and statistical models for Cr(VI) and Cu(II) adsorption onto GO/SiO$_2$@PANI composite at different temperatures: (a) Cr(VI) at 30° C., (b) Cu(II) at 30° C., (c) Cr(VI) at 40° C., (d) Cu(II) at 40° C., (e) Cr(VI) at 50° C., and (f) Cu(II) at 50° C.
Figure 7B:
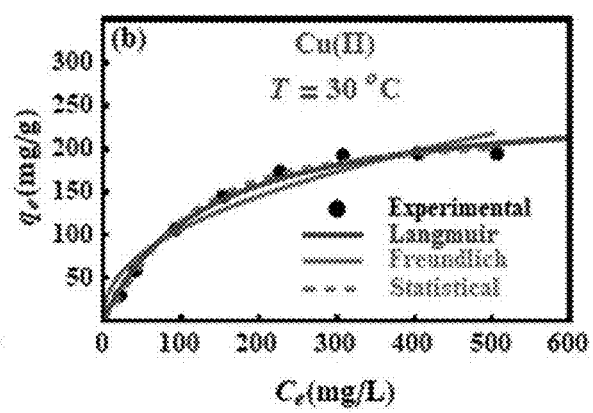
Figure 7C:
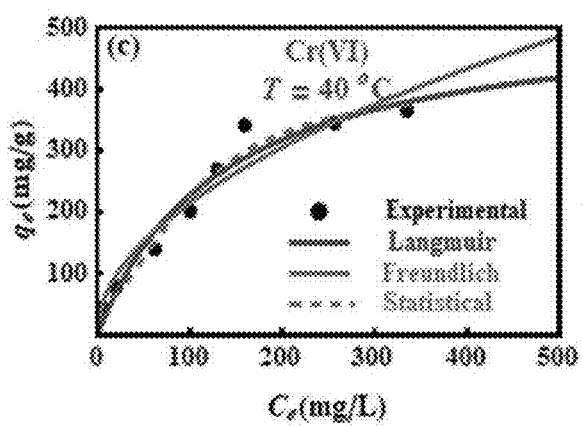
Figure 7D:
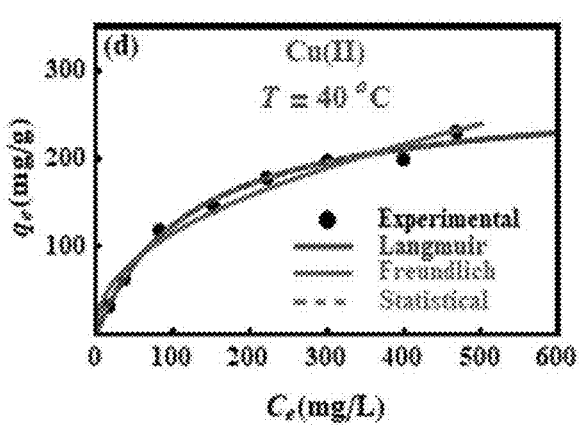
Figure 7E:
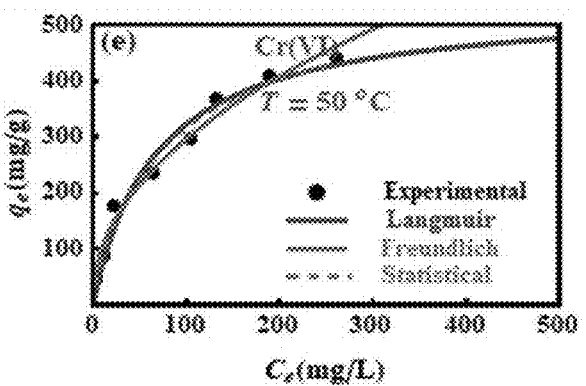
Figure 7F:
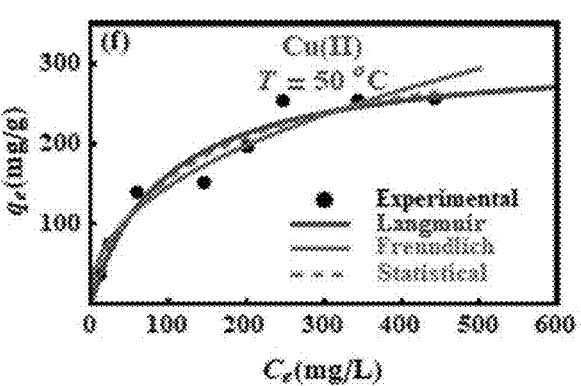

FIG. 6e displayed the deconvoluted Cr 2p peaks at BE 577.8 eV and 586 eV of the Cr(III) while peaks for Cr(VI) appeared at 579.38 eV for Cr 2p$_{3/2}$ and 589 eV for Cr 2p$_{1/2}$ which showing the transformation of Cr(VI) to Cr(III) after interaction with GO/SiO2@PANI. The adsorption reduction behavior of Cr(VI) to Cr(III) can be explained via a multiple stage mechanism: (i) pH study showed that optimum removal of the Cr(IV) occurs at pH 3. At this pH, Cr(VI) adsorbed electrostatically on active sites (—N$^+$—, —OH$^{2+}$ of GO/SiO2@PANI. (ii) Electron rich N containing functional groups reduced to Cr(III) from Cr(VI). (iii) Deprotonated —N— groups of PANI, carboxylic and hydroxyl groups of the GO and SiO2 adsorbed the Cr(III) (Xu et al., 2019).

Traditional Isotherms Modeling

The non-linear method of $q_e$ versus $C_e$ (FIG. 7) was used to calculate the constants of Langmuir and Freundlich equations as given in Table 3. According to higher $R^2$ values, at 30, 40, and 50° C., the two traditional models described well the Cu(II) and Cr(VI) adsorption data ($R^2$>0.97). The maximum capacities of the Langmuir adsorption model presented the values between 258.27 and 314.11 mg/g for Cu(II) but 512.47, to 540.17 mg/g for Cr(VI) at 30-50° C., respectively (Table 3). Thus, the synthetic GO/SiO2@PANI composite was more selective for Cr(VI) ions, and scavenging process for the studied metal ions was endothermic (Selim et al., 2019). Furthermore, the $K_F$ values resulting from the Freundlich model were improved by increasing the solution temperature (30-50° C.), which approves the endothermic nature of metals scavenging processes. Furthermore, the values of 1/n for both metal were <1 at all the studied temperatures, reflecting the favorable adsorption of Cr(VI) and Cu(II) onto GO/SiO2@PANI composite.

TABLE 3

Parameters of classical isotherms models for Cr(VI) and Cu(II) adsorption onto GO/SiO$_2$@PANI composite.

| Isotherm Model | | T(° C.) | $q_{max}$(mg/g) | $K_L$ (L/mg) | $R^2$ |
|---|---|---|---|---|---|
| Langmuir | Cr(VI) | 30 | 512.475 | 0.007 | 0.9852 |
| | | 40 | 530.672 | 0.008 | 0.9897 |
| | | 50 | 540.167 | 0.015 | 0.9935 |
| | Cu(II) | 30 | 258.275 | 0.008 | 0.9977 |
| | | 40 | 276.55 | 0.009 | 0.9986 |
| | | 50 | 314.11 | 0.011 | 0.9896 |

| | | | $K_F$ | 1/n | $R^2$ |
|---|---|---|---|---|---|
| Freundlich | Cr(VI) | 30 | 17.685 | 0.520 | 0.9758 |
| | | 40 | 21.079 | 0.505 | 0.9843 |
| | | 50 | 35.078 | 0.463 | 0.9951 |
| | Cu(II) | 30 | 13.839 | 0.444 | 0.9869 |
| | | 40 | 14.254 | 0.454 | 0.9946 |
| | | 50 | 20.266 | 0.431 | 0.9885 |

Advanced isotherms modeling

The resulting $R^2$ and RMSE values indicated that model 2 (single layer with dual-energy sites) and model 4 (double layer with dual-energy sites) defined the Cr(VI) as well as Cu(II) scavenging results, respectively. Therefore, model 2 for Cr(VI) and model 4 for Cu(II) were applied in the determination of the physicochemical parameters (steric and energetic). The scavenging of both metal ions onto GO/SiO2@PANI at (30, 40, and 50° C. was sterically and energetically interpreted through the best acceptable models. Interpretation of metal ions sequestration isotherms via the obtained physicochemical parameters is very important at the molecular level.

Interpretation of Steric Parameters (n, $N_M$, $Q_{sat}$)

Essentially, the n parameter represents the number of linked Cr(VI) or Cu(II) ions per each available site (functional group) on as synthesized GO/SiO2@PANI composite at all tested temperatures.

Figure 8A:
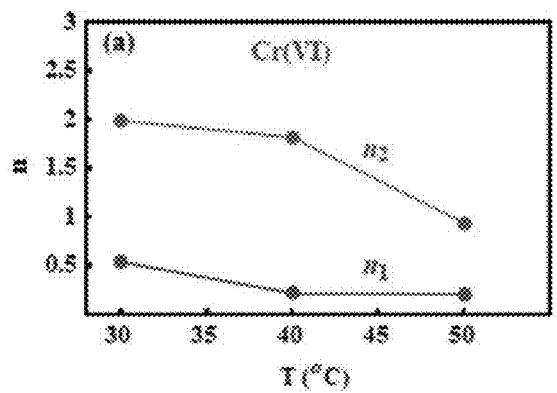
FIGS. 8A-H. Evolution of n, $N_M$, Qe, and ΔE as a function of temperature for Cr(VI) and Cu(II) adsorption onto GO/SiO$_2$@PANI composite: (a) n of Cr(VI), (b) n of Cu(II), (c) $N_M$ of Cr(VI), (d) $N_M$ of Cu(II), (e) Qe of Cr(VI), (f) Qe of Cu(II), (g) ΔE of Cr(VI), and (h) ΔE of Cu(II).

Moreover, this parameter is necessary for identification of the geometrical orientation (vertical or horizontal) and the mechanism (multi-docking/multi-molecular) of the adsorbate ions on the investigated adsorbent. Vertical orientation and multi-molecular mechanism are related to n>unity (i.e., one active site of the GO/SiO2@PANI composite can remove many Cr(VI) or Cu(II) ions). On the contrary, horizontal direction and multi-docking mechanism is associated with n<unity, which indicates that numerous receptor sites of the considered composite can adsorb one of Cr(VI) or Cu(II) ion (Li et al., 2019; Selim et al., 2019). Based on model 2, the n parameter offered two values ($n_1$ and $n_2$) for the adsorbed hexavalent Cr ions at each tested temperature (FIG. 8a). With an increment of the operating temperature from 30 to 50° C., a decrease of the $n_1$ values from 0.54 to 0.21 was detected (Table 4).

TABLE 4

Steric and energetic parameters of model 2 and model 4 at different temperatures.

| Statistical model | Parameter | T = 30° C. | T = 40° C. | T = 50° C. |
|---|---|---|---|---|
| Model 2 | $n_1$ (—) | 0.54 | 0.28 | 0.21 |
| Cr(VI) | $n_2$ (—) | 1.99 | 1.85 | 1.02 |
| | $N_{1M}$ (mg/g) | 232.30 | 241.88 | 278.02 |
| | $N_{2M}$ (mg/g) | 139.05 | 190.29 | 529.55 |
| | $Q_{sat1}$ (mg/g) | 125.91 | 67.73 | 59.22 |
| | $Q_{sat2}$ (mg/g) | 276.71 | 352.04 | 540.14 |
| Model 4 | n (—) | 0.95 | 0.803 | 0.61 |
| Cu(II) | $N_M$ (mg/g) | 117.18 | 173.84 | 309.09 |
| | $Q_{sat}$ (mg/g) | 111.78 | 139.60 | 187.31 |

Figure 8B:
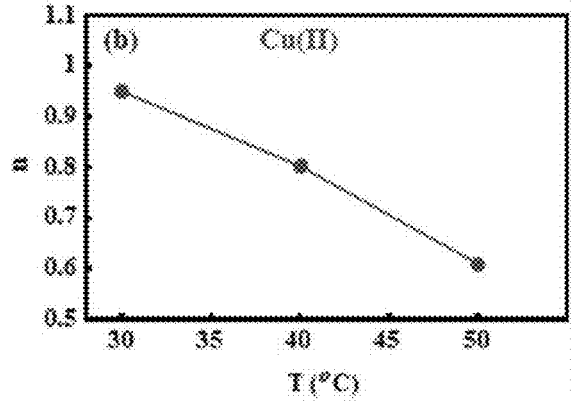

Therefore, horizontal orientation and multi-docking mechanism were expected for Cr(VI) ions through their adsorption onto GO/SiO2@PANI composite at all temperatures (Mohamed et al., 2020). On the other hand, the $n_2$ values were greater than unity at 30, 40, and 50° C. (Table 4) characterizing multi-molecular mechanism and vertical direction for Cr(VI) uptake onto GO/SiO2@PANI composite. Based on the attained $n_1$ and $n_2$ values, the geometry and the mechanism of the removed Cr ions by the developed composite were varied and —OH$^{2+}$, Si—OH$^+$, and COOH$^{2+}$ groups on the GO/SiO2@PANI composite surface, which could remove chromium anions/cations through different interactions (Li et al., 2019; Seliem and Mobarak, 2019). Regarding Cu(II) ions (FIG. 8b), all n values were found to be <1.0, reflecting a multidocking mechanism and horizontal position for the adsorbed copper ions. The Cu(II) ions aggregation onto GO/SiO2@PANI composite active sites was intensively decreased, especially at the final temperature (50° C.). The impact of temperature in breaking the binding between Cu(II) ions in solutions was expected to be the main reason in the absence of the accumulation phenomena (Atrous et al., 2019). In conclusion, the uptake of Cr(VI) by GO/SiO2@PANI microspheres was controlled by different mechanisms, while Cu(II) uptake was governed only by one mechanism.

Figure 8C:
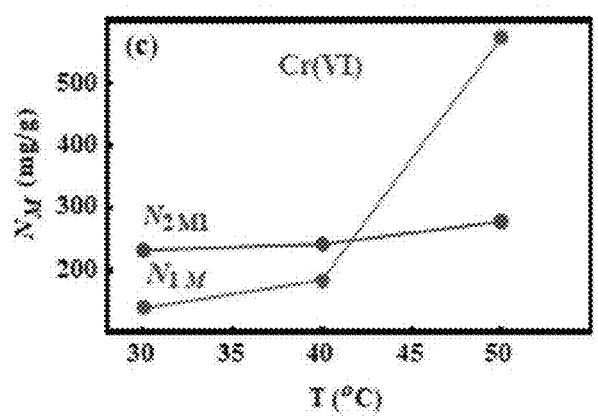
Figure 8D:
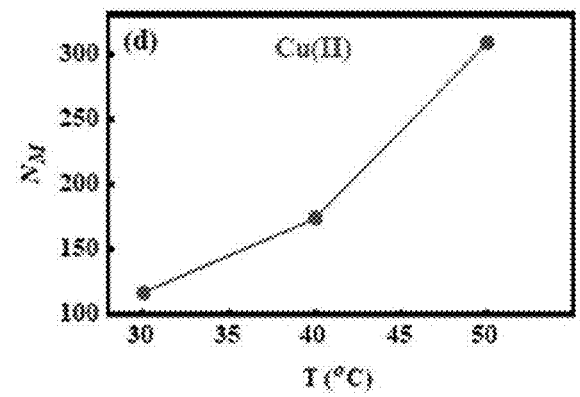

Concerning the density of GO/SiO2@PANI active sites (NM), it can be noticed that the rise in temperature from 30 to 50° C. (FIGS. 8c and d) demonstrated the enhancement of this parameter (Table 4). Therefore, the increment of temperature presented the same style for the adsorbed ions of both metals (i.e., GO/SiO2@PANI active sites number increased with temperature. This increase in the $N_M$ could be correlated to the internal receptor sites in the GO/SiO2@PANI porous structure, which enhanced the sequestering of metal ions (Mobarak et al., 2019).

Figure 8E:
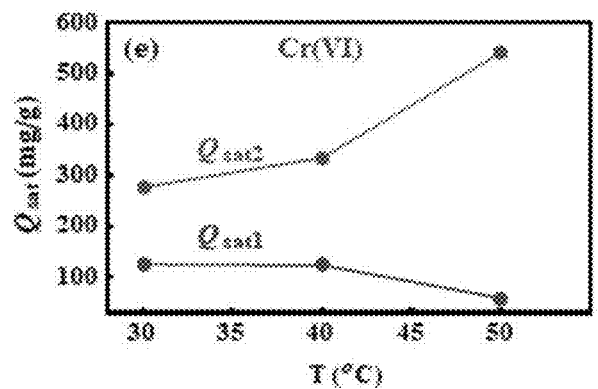
Figure 8F:
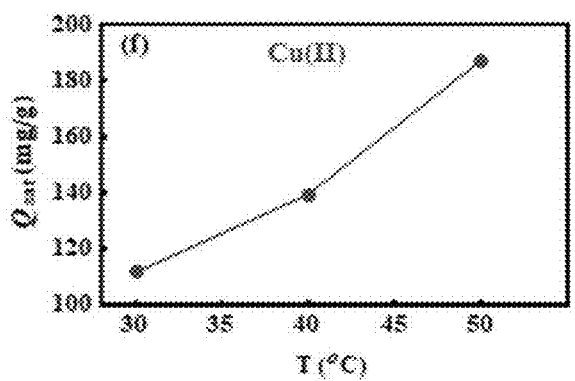

FIGS. 8e and f and Table 4 show the alteration of the adsorption capacity at saturation ($Q_{sat}$) with experimental temperature varied from 30 to 50° C. In this temperature range, the $Q_{sat}$ values were calculated to be (125.91-59.22 mg/g for $Q_{sat1}$) and (139.05-529.55 mg/g for $Q_{sat2}$). Table 4 reflected the same style for the $Q_{sat1}$ and the $n_1$ (i.e., the two steric parameters decreased with temperature), while the $Q_{sat2}$ was in a direct linear trend with the $N_{2M}$ parameter. Therefore, the Cr(VI) adsorption capacities were governed by the n and $N_{2M}$ parameters. The $Q_{sat}$ values for Cu(II) adsorption increases from 111.78, to 187.31 mg/g with improving the tested temperature from 30 to 50° C. (Table 4). Moreover, values of $N_M$ parameter were between 117.18, and 309.09 mg/g at the same solution temperatures. The corresponding trend between the $Q_{sat}$ and $N_M$ parameters with increasing temperature indicated that the density of the GO/SiO2@PANI active sites was considered the main factor in managing the uptake of Cu(II) (Mohamed et al., 2020). In addition, the increment of this statistical parameter ($Q_{sat}$)

with temperature could be related to the fast diffusion of the adsorbed ions into the GO/SiO2@PANI composite pores (Li et al., 2019; Seliem and Mobarak, 2019).

Analysis of Energetic Parameters (ε)

The binding of the metal ions and GO/SiO2@PANI active sites was energetically determined at 30, 40, and 50° C. through the following equations (Seliem and Mobarak, 2019).

$$C_1 = C_s e^{-\Delta E_1/RT} \quad (3)$$

$$C_2 = C_s e^{-\Delta E_2/RT} \quad (4)$$

in which $C_1$ and $C_2$ characterize the concentration at half-saturation and $C_s$ is the solubility of Cr(VI) and Cu(II) in water.

Figure 8G:
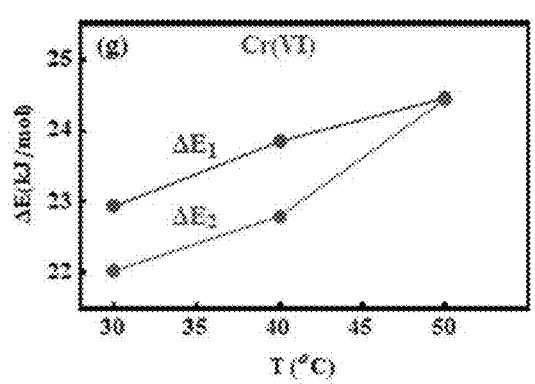
Figure 8H:
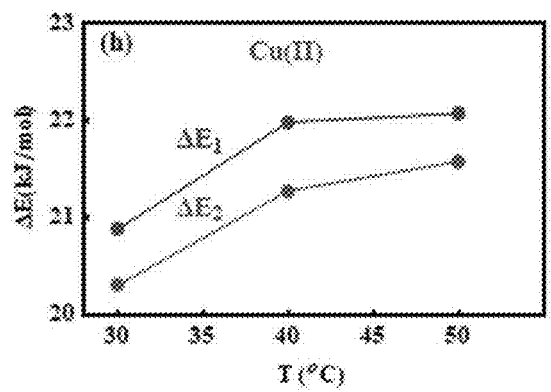

The energies evaluated for the adsorption process at all solution temperatures are represented in FIGS. 8g and h and Cr(VI) adsorption energies range from 22.03 to 24.46 kJ/mol, while the Cu(II) energies were relatively low, giving the values of 20.31e22.07 kJ/mol. Thus, the efficiency of the GO/SiO2@PANI active sites for Cr(VI) uptake was higher as compared to that for the Cu(II). The adsorption energies of Cr(VI) as well as Cu(II) onto GO/SiO2@PANI composite were <40 kJ/mol reflecting the domination of physical interactions such as van der Waals and hydrogen bonding (Atrous et al., 2019).

Co-Adsorption Studies

Competitive co-adsorption of the Cu(II)/Cr(VI) onto GO/SiO2@PANI was studied at pH 3.0, and pH 5.3 is shown in FIG. 9a. In the binary adsorption system, the Cr(VI) uptake efficiency of GO/SiO2@PANI composite was almost the same at pH 3.0, while Cu(II) (pH 5.3) adsorption was high as compared to the single adsorption system. This could be linked with the addition of different receptor sites rose after Cr(VI) adsorption on GO/SiO2@PANI, which frequently, enhanced the removal of Cu(II). Based on these results, the selectivity of GO/SiO2@PANI composite for Cu(II) was augmented in the existence of Cr(VI). Although, Cr(VI) affinity onto GO/SiO2@PANI was the same in the single and binary systems.

Role of Ionic Salt on Adsorption

The influence of ionic salts (i.e., NaCl and $Na_2SO_4$) on Cu(II)/Cr(VI) adsorption on GO/SiO2@PANI composite is depicted in FIG. 9b. Both metal ions show the opposite adsorption behavior. The scavenging of Cu(II) by GO/SiO2@PANI composite decreases with the surge in the concentration of NaCl and $Na_2SO_4$ from 25 mg/L to 100 mg/L.

The formation of ion pairs and competitive adsorption between Na(I) and Cu(II) for the same adsorption sites, decrease in Cu(II) adsorption in the presence of NaCl and $Na_2SO_4$ (Zhang et al., 2019). In Cr(VI) adsorption, Na(I) may form the ionic layer on GO/SiO2@PANI microspheres, which facilitate the higher adsorption of negatively charged $HCrO_4^-$ (Durano_glu et al., 2012).

Regeneration Studies

Elution of Cu(II) and Cr(VI) was tested using 0.1 M HCl and 0.1 M NaOH as eluent. Regeneration studies were performed by dispersing the 0.02 g of the saturated GO/SiO2@PANI composite in 20 mL solution at 30° C. for 6 h. Thereafter, GO/SiO2@PANI composite was centrifuged, washed, and dried for 12 h at 80° C. The regenerated GO/SiO2@PANI composite was further used for Cu(II) and Cr(VI) adsorption at optimum conditions. The adsorption regeneration of the GO/SiO2@PANI microsphere was performed four times, and the results were depicted in FIG. 9c. GO/SiO2@PANI composite displayed an excellent regeneration capacity, and therefore, it could be easily regenerated and repeatedly applied for water purification.

Comparison with Other Previous Studies

Silica based materials are extensively used in the application of metal recovery and water treatment (Bilgiç; Çimen, 2019: Borra et al., 2016). The efficiency of GO/SiO2@PANI has been compared with previously reported silica based adsorbents, and the maximum adsorption capacities have been tabulated in Table 5. The results indicated that GO/SiO2@PANI composite was an efficient material for sequestering of the heavy metals.

TABLE 5

Comparison of monolayer uptake capacities of Cu(II) and Cr(VI onto silica based adsorbents.

| Adsorbents | Adsorption capacity (mg/g) | References |
|---|---|---|
| Cu(II) adsorption | | |
| Diethylene triamine functionalized mesoporous silica | 139.9 | (Deyet et al., 2008) |
| 4,4-oxy-bis(chlorophenyl glyoxime) modified silica | 3.49 | (Gubbuk et al., 2009) |
| ethylene diamine modified mesoporous silica | 88.9 | (Sales et al., 2005) |
| 2-aminomethylpyridine modified silica | 53.3 | (Sales et al., 2004) |
| Thiol-functionalized MCM-41 silica | 38.12 | (Wu et al., 2010) |
| Bentonite | 45.47 | (Kubilay et al. 2007) |
| Kaolinite | 10.79 | (Yavuz et al., 2007) |
| GO/SiO$_2$@PANI | 258.275 | This Study |
| Cr(VI) adsorption | | |
| Polyethyleneimine grafted micro-sized silica gel | 140.0 | (Gao et al., 2009) |
| La(III)/silica gel/chitosan nano composite | 240.0 | (Gandhi and Meenakshi 2012) |
| Polyaniline synthesized on jute fiber | 62.9 | (Kumar et al., 2008) |
| Cyphos [A336][C272] functionalized silica (SG-5) | 15.29 | (Liu et al., 2010) |
| Mercaptopropil-silica | 5.2 | (Bois et al., 2003) |
| Aniline formaldehyde condensate coated on silica gel | 17.0 | (Kumar et al., 2007) |
| Chitosan | 154.0 | (Boddu etal., 2003) |
| GO/SiO$_2$@PANI | 512.47 | This Study |

Conclusion

Herein, a renewable and multifunctional GO/SiO2@PANI composite has been successfully fabricated and applied for scavenging of cationic Cu(II) and anionic Cr(VI) from contaminated aquatic solution. Adsorption for both ions was directed at three temperatures (30, 40, and 50° C.) and pH values of 5.3 for Cu(II) and 3.0 for Cr(VI). The adsorption mechanism was studied by FTIR, XPS, and advanced statistical physics models. The Cr(VI) sequester onto GO/SiO2@PANI composite was controlled by different mechanisms, while Cu(II) uptake was governed only by one mechanism. Physicochemical parameters (steric and energetic) controlling the sequestering of both metal ions were calculated and discussed. Energetically, the adsorption process is endothermic and physical in nature. Based on co-adsorption, reusability, and comparison analysis, the GO/SiO2@PANI is an efficient scavenger for metal ions from water. This composite is a new multifunctional material for the removal of metal ions frome pure as well as mixed contaminated water.

Acknowledgment

This project was funded by the research and development office (RDO) at the Ministry of Education, Kingdom of Saudi Arabia, Grant no. (HIQI-15-2019). The inventors also, acknowledge with thanks research and development office at King Abdulaziz University (RDO-KAU) for technical support.

REFERENCES

ALOthman, Z. A., Naushad, M., Ali, R., 2013. Kinetic, equilibrium isotherm and thermodynamic studies of Cr(VI) adsorption onto low-cost adsorbent developed from peanut shell activated with phosphoric acid. Environ. Sci. Pollut. Res. 20, 3351e3365.

Alqadami, A. A., Khan, M. A., Otero, M., Siddiqui, M. R., Jeon, B.-H., Batoo, K. M., 2018. A magnetic nanocomposite produced from camel bones for an efficient adsorption of toxic metals from water. J. Clean. Prod. 178, 293e304.

Atrous, M., Sellaoui, L., Bouzid, M., Lima, E. C., Thue, P. S., Petricioletc, A. B., Ben Laminea, A., 2019. Adsorption of dyes acid red 1 and acid green 25 on grafted clay: modelingand statistical physics interpretation. J. Mol. Liq. 249, 111610.

Awual, M. R., 2015. A novel facial composite adsorbent for enhanced copper (II) detection and removal from wastewater. Chem. Eng. J. 266, 368e375.

Barakat, M. A., Kumar, R., Balkhyoura, M., Taleb, M. A., 2019. Novel Al2O3/GO/halloysite nanotube composite for sequestration of anionic and cationic dyes. RSC Adv. 9, 13916.

Bhaumik, M., Choi, H. J., McCrindle, R. I., Maity, A., 2014. Composite nanofibers prepared from metallic iron nanoparticles and polyaniline: high performance for water treatment applications. J. Colloid Interface Sci. 425, 75e82.

Bilgiç, A., Çimen, A., 2019. Removal of chromium(VI) from polluted wastewater by chemical modification of silica gel with 4-acetyl3-hydroxyaniline. RSC Adv. 9, 37403e37414.

Boddu, V. M., Abburi, K., Talbot, J. I., Smith, E. D., 2003. Removal of hexavalent chromium from wastewater using a new composite chitosan biosorbent. Environ. Sci. Technol. 37, 4449e4456.

Bois, L., Bonhomme, A., Ribes, A., Pais, B., Raffin, G., Tessier, F., 2003. Functionalized silica for heavy metal ions adsorption. Colloids Surf, A 221, 221e230.

Borra, C. R., Blanpain, B., Pontikes, Y., Binnemans, K., Gerven, T., 2016. Recovery of rare earths and other valuable metals from bauxite residue (red mud): a review. J. Sustain. Metall. 2, 365e386.

Burakov, A. E., Galunin, E. V., Burakova, I. V., Kucherova, A. E., Agarwal, S., Tkachev, A. G., Gupta, V. K., 2018. Adsorption of heavy metals on conventional and nanostructured materials for wastewater treatment purposes: a review. Ecotoxicol. Environ. Saf. 148, 702e712.

Da'na, E., Sayari, A., 2013. Modeling adsorption of copper on amine-functionalized SBA-15: predicting breakthrough curves. J. Environ. Eng. 139.

Demiral, H., Güngor, C., 2016. Adsorption of copper(II) from aqueous solutions on activated carbon prepared from grape bagasse. J. Clean. Prod. 124, 103e113.

Dey, R. K., Oliveira, F. J. V. E., Airoldi, C., 2008. Mesoporous silica functionalized with diethylenetriamine moieties for metal removal and thermodynamics of cationbasic center interactions. Colloid. Surface. Physicochem. Eng. Aspect. 32, 41e46.

Duranoglu, D., Trochimczuk, A. W., Beker, U., 2012. Kinetics and thermodynamics of hexavalent chromium adsorption onto activated carbon derived from acrylonitriledivinylbenzene copolymer. Chem. Eng. J. 187, 193e202.

Freundlich, H. M. F., 1906. Over the adsorption in solution. J. Phys. Chem. 57, 385e471.

Fu, F., Wang, Q., 2011. Removal of heavy metal ions from wastewaters: a review. J. Environ. Manag. 92, 407e418.

Gandhi, R., Meenakshi, S. M., 2012. Recent advancement in heavy metal removal onto silica based adsorbents and chitosan composites—a review. J. Hazard Mater. 203e204, 29e37.

Gao, B., Li, Y., Chen, Z., 2009. Functionalized dithiocarbamate chelating resin for the removal of Co2b from simulated wastewater. Chem. Eng. J. 150, 337e343.

Gao W, Alemany L B, Ci L, Ajayan P M. New insights into the structure and reduction of graphite oxide. Nat Chem. (2009) 1:403-8. doi: 10.1038/nchem.281.

GracePavithra, K., Jaikumar, V., Kumar, P. S., undarRajanP, S., 2019. A review on cleaner strategies for chromium industrial wastewater: present research and future perspective. J. Clean. Prod. 228, 580e593.

Gubbuk, I. H., Hatay, I., Coskun, A., Ersoz, M., 2009. Immobilization of 4-amino-2-hydroxyacetophenone onto silica gel surface and sorption studies of Cu(II), Ni(II), and Co(II) ions. J. Hazard Mater. 172, 1532e1537.

Javadian, H., Sorkhrodi, F. Z., Koutenaei, B. B., 2014. Experimental investigation on enhancing aqueous cadmium removal via nanostructure composite of modified hexagonal type mesoporous silica with polyaniline/polypyrrole nanoparticles. Ind. Eng. Chem. Res. 20 (5), 3678e3688.

Jilani, A., Othman, M. H. D., Ansari, M. O., Kumar, R., Alshahrie, A., Ismail, A., Khan, I. U., Sajit, V. K., Barakat, M., 2017. Facile spectroscopic approach for optoelectronic properties of few-layered graphene oxide thin films and its role in photocatalysis as composite with RF sputtered ZnO. New J. Chem. 41, 14217e14227.

Kubilay, S., Gtirkan, R., S avran, A., Sahan, T., 2007. Removal of Cu(II), Zn(II) and Co(II) ions from aqueous solutions by adsorption onto natural bentonite. Adsorption 13, 41e51.

Kumar, P. A., Ray, M., Chakraborty, S., 2007. Hexavalent chromium removal from wastewater using aniline formaldehyde condensate coated silica gel. J. Hazard Mater. 143, 24e32.

Kumar, P. A., Chakraborty, S., Ray, M., 2008. Removal and recovery of chromium from wastewater using short chain polyaniline synthesized on jute fiber. Chem. Eng. J. 141, 130e140.

Kumar, R., Barakat, M. A., Alseroury, F. A., 2017. Oxidized g-C3N4/polyaniline nanofiber composite for the selective removal of hexavalent chromium. Sci. Rep. 7 (12850), lel 1.

Langmuir, I., 1916. The constitution and fundamental properties of solids and liquids. J. Am. Chem. Soc. 38, 2221e2295.

Li, Z., Sellaoui, L., Dotto, G. L., Lamine, A. B., Petriciolet, A. B., Hanafy, H., Belmabrouk, H., Matias, S. N., Erto, A., 2019. Interpretation of the adsorption mechanism of reactive black 5 and Ponceau 4R dyes on chitosan/polyamide nanofibers via advanced statistical physics model. J. Mol. Liq. 258, 165e170.

Liu, Y., Guo, L., Zhu, L., Sun, X., Chen, J., 2010. Removal of Cr(II, VI) by quaternary ammonium and quaternary phosphonium ionic liquids functionalized silica materials. Chem. Eng. J. 158, 108e114.

Ma, Y., Zhou, Q., Zhou, S. C., Wang, W., Jin, J., Xie, J. W., Li, A., Shuang, C. D., 2014. A bifunctional adsorbent with high surface area and cation exchange property for synergistic removal of tetracycline and Cu2k. Chem. Eng. J. 258, 26e33.

Mobarak, M., Mohamed, E. A., Selim, A. Q., Sellaoui, L., Ben Laminec, A., Erto, A., Bonilla-Petriciolete, A., Seliem, M. K., 2019. Surfactantemodified serpentine for fluoride and Cr(VI) adsorption in single and binary systems: experimental studies and theoretical modeling. Chem. Eng. J. 360, 333e343.

Mohamed, E. A., Selim, A. Q., Zayed, A. M., Komarneni, S., Mobarak, M., Seliem, M. K., 2019. Enhancing adsorption capacity of Egyptian diatomaceous earth by thermochemical purification: methylene blue uptake. J. Colloid Interface Sci. 534, 408e419.

Mohamed, E. A., Selim, A. Q., Ahmed, S. A., Sellaoui, L., Petriciolet, A. B., Erto, A., Li, Z., Li, Y., Seliem, M. K., 2020. H2O2-activated anthracite impregnated with chitosan as a novel composite for Cr(VI) and methyl orange adsorption in singlecompound and binary systems: modeling and mechanism interpretation. Chem. Eng. J. 380, 122445.

Ordinartsev, D. P., Sviridov, A. V., Sviridov, V. V., 2018. Extracting vanadium, molybdenum, and tungsten from acidic solutions via adsorption on modified montmorillonite. Russ. J. Phys. Chem. 92 (10), 2060e2064.

Pacheco, S., Medina, M., Valencia, F., Tapia, J., 2006. Removal of inorganic mercury from polluted water using structured nanoparticles. J. Environ. Eng. 342e349.

Rasaki, S. A., Bingxue, Z., Guarecuco, R., Thomas, T., Minghui, Y., 2019. Geopolymer for use in heavy metals adsorption, and advanced oxidative processes: a critical review. J. Clean. Prod. 213, 42e58.

Renu, Agarwal, M., Singh, K., 2017. Heavy metal removal from wastewater using various adsorbents: a review. J. Water. Reuse. and Desal. (4), 387e419, 07.

Sales, J. A. A., Faria, F. B., Prado, A. G. S., Airoldi C, C., 2004. Chemically modified silica gel with 1-{4-[(2-hydroxy-benzylidene)amino]phenyl}ethanone: Synthesis, characterization and application as an efficient and reusable solid phase extractant for selective removal of Zn(II) from mycorrhizal treated fly-ash samples. Polyhedron 23, 719e725.

Sales, J. A. A., Prado, A. G. S., Airoldi, C., 2005. Interaction of divalent copper with two diaminealkyl hexagonal mesoporous silicas evaluated by adsorption and thermochemical data. Surf. Sci. 590, 51e62.

Seliem, M. K., Mobarak, M., 2019. Cr(VI) uptake by a new adsorbent of CTABemodified carbonized coal: experimental and advanced statistical physics studies. J. Mol. Liq. 294, 111676.

Selim, A., Mohamed, E. A., Seliem, M. K., 2019. Deep insights into the organic carbon role in selectivity and adsorption mechanism of phosphate and crystal violet onto lowecost black limestone: modelling and physicochemical parameters interpretation. Colloids Surf, A 580, 123755.

Selim, A. Q., Sellaoui, L., Ahmed, S. A., Mobarak, M., Mohamed, E. A., Ben Lamine, A., Erto, A., Petriciolet, A. B., Seliem, M. K., 2019. Statistical physics-based analysis of the adsorption of Cu2b and Zn2b ontosynthetic cancrinite in single-compound and binary systems. J. Environmental Chemical Engineering 7, 103217.

Shen, Y. F., Tanga, J., Nie, Z. H., Wang, Y. D., Ren, Y., Zuo, L., 2009. Preparation and application of magnetic Fe3O4 nanoparticles forwastewater purification. Separ. Purif. Technol. 68, 312e319.

Shimano, J. Y., MacDiarmid, A. G., 2001. Polyaniline, a dynamic block copolymer: key to attaining its intrinsic conductivity. Synth. Met. 123, 251.

Srivastava, V., Sharma, Y. C., Sillanp€a€a, M., 2015. Response surface methodological approach for the optimization of adsorption process in the removal of Cr(VI) ions by Cu2(OH)2CO3 nanoparticles. Appl. Surf. Sci. 326, 257e270.

Szabo, T., Berkesi, O., Forgo, P., Josepovits, K., Sanakis, Y., Petridis, D., Dekany, I., 2006. Evolution of surface functional groups in a series of progressively oxidized graphite oxides. Chem. Mater. 18 (18), 2740e2749.

Tian, X. K., Wang, W. W., Wang, Y. X., Komarneni, S., Yang, C., 2015. Polyethylenimine functionalized halloysite nanotubes for efficient removal and fixation of Cr(VI). Microporous Mesoporous Mater. 207, 46e52.

Vargas, L. R., Poli, A. K., Dutra R de C_assia, L., de Souza, C. B., Baldan, M. R., Gonsalves, E. S., 2017. Formation of composite polyaniline and graphene oxide by physical mixture method. J. Aero. Technol. Manag. 9, 29e38.

Viraraghavan, T., Subramanian, K. S., Aruldoss, J. A., 1999. Arsenic in drinking water problems and solutions, Water. Sci. Technol. 40 (2), 69e76.

Wang, H., Hao, Q., Yang, X., Lu, L., Wang, X., 2009. Graphene oxide doped polyaniline for supercapacitors. Electrochem. Commun. 11, 1158e1161.

Wu, S., Li, F., Xu, R., Wei, S., Li, G., 2010. Synthesis of thiol-functionalized MCM-41 mesoporous silicas and its application in Cu(II), Pb(II), Ag(I), and Cr(III) removal. J. Nanoparticle Res. 12, 2111e2124.

Xu, B., Yue, S., Sui, Z., Zhang, X., Hou, S., Cao, G., Yang, Y., 2011. What is the choice for supercapacitors: graphene or graphene oxide? Energy. Environ. Sci. 4, 2826.

Xu, J., Zhu, S., Liu, P., Gao, W., Li, J., Mo, L., 2017. Adsorption of Cu(II) ions in aqueous solution by aminated lignin from enzymatic hydrolysis residues. RSC Adv. 7, 44751e44758.

Xu, Y., Chen, J., Chen, R., Yu, P., Sheng, Wang G X., 2019. Adsorption and reduction of chromium(VI) from aqueous solution using polypyrrole/calcium rectorite composite adsorbent. Water Res. 160, 148e157.

Yavuz, O., Altunkaynak, Y., Güzel, F., 2007. Eco-friendly technologies for removal of hazardous heavy metals from water and industrial wastewater. Water Res. 37, 948e952.

Yoo, S., Lunn, J. D., Gonzalez, S., Ristich, J. A., Simanek, E. E., Shantz, D. F., 2006. Engineering nanospaces: OMS/dendrimer hybrids possessing controllable chemistry and porosity. Chem. Mater. 18, 2935e2942.

Youssef, A. M., El-Naggar, M. E., Malhat, F. M., El-Sharkawi, H. M., 2019. Efficient removal of pesticides and heavy metals from wastewater and the antimicrobial activity of f-MWCNTs/PVA nanocomposite film. J. Clean. Prod. 206, 315e325.

Zhang, W. L., Choi, H. J., 2012. Silica-graphene oxide hybrid composite particles and their electroresponsive characteristics. Langmuir 28, 7055e7062.

Zhang, W. L., Park, B. J., Choi, H. J., 2010. Colloidal graphene oxide/polyaniline nanocomposite and its electrorheology. Chem. Commun. 46, 5596e5598.

Zhang, X. Q., Guo, Y., Li, W. C., 2015. Efficient removal of hexavalent chromium by high surface area Al2O3 rods. RSC Adv. 5, 25896e25903.

Zhang, Y., Zhu, C., Liu, F., Yuan, Y., Wua, H., Li, A., 2019. Effects of ionic strength on removal of toxic pollutants from aqueous media with multifarious adsorbents: a review. Sci. Total Environ. 646, 265e279.

Zhou, Q., Liao, B., Lin, L., Qiu, W., Song, Z., 2018. Adsorption of Cu(II) and Cd(II) from aqueous solutions by ferromanganese binary oxideebiochar composites. Sci. Total Environ. 615, 115e122.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A composite for adsorption of metal ions, consisting of silica microparticles, wherein the microparticles have a diameter of at least 200 nm;

graphene oxide sheets, wherein the graphene oxide sheets comprise 10-20 wt % of the composite; and and polyaniline, wherein the polyaniline comprises 5-15 wt % of the composite, wherein the graphene oxide sheets and polyaniline are distributed on a surface of the silica microparticles.

2. The composite of claim 1, wherein the graphene oxide sheets and polyaniline are non-uniformly distributed on the surface of the silica microparticles.

3. A method for removing metal ions from a solution, comprising
    contacting the solution with the composite of claim 1 under conditions suitable for adsorption of metal ions to the composite; and
    recovering the composite from the solution.

4. The method of claim 3, further comprising removing the adsorbed metal ions from the composite to provide a recycled composite.

5. The method of claim 4, further comprising contacting a solution comprising metal ions with the recycled composite under conditions suitable for adsorption of metal ions to the composite.

6. The method of claim 3, wherein the solution is an aqueous solution.

7. The method of claim 3, wherein the metal ions include cationic and anionic metal ions.

8. The method of claim 3, wherein the metal ions comprise at least one of cationic Cu(II) and anionic Cr(VI) metal ions.

9. The method of claim 3, wherein the metal ions include each of cationic Cu(II) and anionic Cr(VI) metal ions.

10. The method of claim 3, wherein the pH of the solution is maintained between 2-6 during the contacting step.

11. A method of making the composite of claim 1, comprising a step of in situ aniline polymerization in the existence of graphene oxide and $SiO_2$.

12. The composite of claim 1, wherein the silica microparticles are not formed from a silica gel.

* * * * *

UNITED STATES PATENT AND TRADEMARK OFFICE
CERTIFICATE OF CORRECTION

| | |
|---|---|
| PATENT NO. | : 11,332,389 B1 |
| APPLICATION NO. | : 17/200974 |
| DATED | : May 17, 2022 |
| INVENTOR(S) | : Mohamed Barakat et al. |

It is certified that error appears in the above-identified patent and that said Letters Patent is hereby corrected as shown below:

On the Title Page

Item (54) and in the Specification, Column 1, Lines 1-3, Pleas correct the title to read:
"RECYCLABLE MULTIFUNCTIONAL COMPOSITES FOR METAL ION REMOVAL FROM WATER"

Item (72) Please correct the third inventor's name to read:
"Md. Abu Taleb"

Item (72) Please correct fourth inventor's residence to read:
"Beni Suef (EG)"

Signed and Sealed this
Twenty-third Day of August, 2022

Katherine Kelly Vidal
*Director of the United States Patent and Trademark Office*